US011250500B2

(12) United States Patent
George et al.

(10) Patent No.: US 11,250,500 B2
(45) Date of Patent: Feb. 15, 2022

(54) METHOD AND SYSTEM FOR PERFORMING INCOME ANALYSIS FROM SOURCE DOCUMENTS

(71) Applicants: Ronald Frederick George, Troy, MI (US); Anneliese Rossi, Rochester Hills, MI (US)

(72) Inventors: Ronald Frederick George, Troy, MI (US); Anneliese Rossi, Rochester Hills, MI (US)

(73) Assignee: LOANCRAFT, LLC, Troy, MI (US)

( * ) Notice: Subject to any disclaimer, the term of this patent is extended or adjusted under 35 U.S.C. 154(b) by 210 days.

(21) Appl. No.: 15/943,460

(22) Filed: Apr. 2, 2018

(65) Prior Publication Data

US 2018/0293648 A1    Oct. 11, 2018

Related U.S. Application Data

(60) Provisional application No. 62/479,895, filed on Mar. 31, 2017.

(51) Int. Cl.
*G06Q 40/02* (2012.01)
*G06K 9/42* (2006.01)
*G06K 9/00* (2006.01)
*G06K 9/62* (2022.01)

(52) U.S. Cl.
CPC ......... *G06Q 40/02* (2013.01); *G06K 9/00449* (2013.01); *G06K 9/00469* (2013.01); *G06K 9/6267* (2013.01); *G06K 2209/01* (2013.01)

(58) Field of Classification Search
CPC ...... G06Q 40/00; G06Q 40/123; G06Q 30/04; G06Q 40/02; H04L 63/123; G06F 16/2462; G06F 16/246; G06F 16/254; G06K 9/6267; G06K 9/00449; G06K 9/00469; G06K 2209/01
USPC .......................................................... 705/35
See application file for complete search history.

(56) References Cited

U.S. PATENT DOCUMENTS

| | | | | |
|---|---|---|---|---|
| 7,840,891 B1* | 11/2010 | Yu | ......................... | G06F 40/197 715/223 |
| 8,373,912 B2* | 2/2013 | Pandipati | ................. | H04N 1/04 358/474 |
| 2012/0265655 A1* | 10/2012 | Stroh | ..................... | G06Q 30/04 705/30 |

* cited by examiner

*Primary Examiner* — Clifford B Madamba
(74) *Attorney, Agent, or Firm* — Nixon Peabody LLP

(57) ABSTRACT

An example method and system for income determination analysis is disclosed. A document packet of income related documents is converted to an image file. The image file is split into separate documents and the separated documents are classified. An automated scanning tool is selected for the separated documents. Income related data is determined from the separated documents. An interface may be generated based on the confidence of the determined income related data for operator input and validation of the income related data. Multiple models are applied for calculation of income. A virtual panel is provided that incorporates the results of the multiple models to determine if further analysis is required.

16 Claims, 23 Drawing Sheets

650 →
670 →

| K1 for 1065 | | | |
|---|---|---|---|
| Line | Description | Amount | |
| YR | Year | 2015 | |
| C | Company Name | *Nothing, E* | |
| EIN | EIN | 343434343 | |
| F | Partner's name | Alan George | |
| 1 | Ordinary business income. | 144,655 | |
| 2 | Net rental real estate income. | -521 | |
| 3 | Other net rental income. | 611 | |
| 4 | Guaranteed payments | 4,000 | |
| 19 | Distributions | 63,000 | |
| J | Percentage of Capital (Ending %) | 42 | |
| FN | Final K1 checked (Yes/No) | No | |

[ Check ]

[ Save ]

[ Delete ]

FIG. 6A

| Schedule K-1<br>(Form 1065) | 2015<br>For calendar year 2016, or tax<br>year beginning _____, 2015<br>End _____, _____ | Fianl K-1 ☐ Amended K-1 | 660 651113 |
|---|---|---|---|
| Department of treasury<br>Internal Revenue Service | | Part III Partner's Share of current Year Income,<br>Deductions, Credits, and Other Items | |

| Partner's Share of Income, Deductions,<br>Credits, etc. See separate instruction | | |
|---|---|---|
| Part 1 Information about the partnership | 1 Ordinary business income (loss)<br>144,655. | 15 Credits |
| A Partnership's employer identification number<br>34-343434 | 2 Net rental real estate income (loss)<br>-521. | |
| B Partnership's name, address, city, state, and<br>ZIP code    Bell Boats, LLC<br>535 E. Big Beaver<br>Troy, MI 48083 | 3 Other net rental income<br>611. | 16 Foreign<br>transactions |
| | 4 Guaranteed payments | |
| C IRS Center where partnership filed return<br>Cincinnati OH | 5 Interest income<br>1,297. | |
| D ☐ Check if this is a publicly traded partnership<br>(PTP) | 6a Ordinary dividends<br>62. | |
| | 6b Qualified dividends | |
| Part II Information About the partner | 7 Royalties<br>13,440. | |
| E Partner's identifying number<br>377-90-9090 | 8 Net short-term capitol gain (loss) | |
| F Partner's name, address, city, state, and<br>zip code    Alan George<br>525 E. Big Beaver<br>Troy, MI 48083 | 9a Net long-term capitol gain (loss) | 17 Alternative minimum<br>tax (AMT) items<br>A    -586. |
| | 9b Collectibles (28%) gain (loss) | |
| | 9c Unrecaptured section 1250 gain | |
| G ☒ General partner or LLC ☐ Limited partner or<br>     member-manager      other LLC member | 10 Net section 1231 gain (loss) | 18 Tax-exempt income<br>and nondeductibles<br>expenses |
| | 11 Other income (loss) | A    65. |

FIG. 6B

```xml
19  <!--NON SELF-EMPLOYED WAGES-->
20  <lTaxCalcltem>
21    <TaxFormLineitems>
22      <TaxFormLineitem>
23        <LineNumber/>7</LineNumber>
24        <Operation>Add</Operation>
25        <Amount>0</Amount>
26      </TaxFormLineItem>
27    </TaxFormLineItems>
28    </Title>Non-Self-EmployedWages</Title>
29    <LineNumberDescription>Line7</LineNumberDescription>
30    <Operation>Subtract</Operation>
31  </lTaxCalcItem>
32  <!--TAX EXEMPT INTEREST-->
33  <TaxCalcItem>
34
35    <TaxFormLineItems>
36      <TaxFormLineItem>
37        <LineNumber>8b</LineNumber>
38        <Operation>Add</Operation>
39        <Amount>0</Amount>
40      </TaxFormLineItem>
41    </TaxFormLineItems>
42    <Title>Tax-Exempt Interest Income</Title>
43
44    <LineNumberDescription>Line8b, Grossed Up</LineNumberDescription>
45    <Operation>Multiply</Operation>
46    <Multiplier>1.25</Multiplier>
47    <TaxLineIdentifier>Schedule_Form1040TaxExemptInterest</TaxLineIdentifier>
48  </TaxCalcItem>
49  <!--TAXABLE REFUNDS-->
50  <TaxCalcItem>
51    <TaxFormLineItems>
52      <TaxFormLineItem>
53    <LineNumber>10</LineNumber>
54        <Operation>Add</Operation>
55        <Amount>0</Amount>
56      </TaxFormLineItem>
57    </TaxFormLineItems>
58    <Title>Stata& Local Tax Refunds</Title>
59    <LineNumberDescription>Line10</LineNumberDescription>
60    <Operation>Subtract</Operation>
61  </TaxCalcItem>
62  <!--ALIMONY-->
```

FIG. 8

```xml
<CalcListCustomization>
  <CalcList>
    <CalculationItemConfigCustomization CustomizedAction="Modify">
      <Name>Calc.Rental.PropertyGroup.1040.NFR</Name>
      <Description></Description>
      <IncomeItemType>RentalIncome</IncomeItemType>
      <DefaultMethod>False</DefaultMethod>
      <ExcludedEntities></ExcludedEntities>
    </CalculationItemConfigCustomization>
    <CalculationItemConfigCustomization CustomizedAction="Modify">
      <Name><Calc.Rental.PropertyGroup.1040.MDOnly</Name>
      <Description><1040 NM MD Only</Description>
      <IncomeItemType>RentalIncome</IncomeItemType>
      <DefaultMethod>True</DefaultMethod>
      <DefaultSwitchSetting>DefaultForReturns</DefaultSwitchSetting>
      <ExcludedEntities></ExcludedEntities>
    </CalculationItemConfigCustomization>
  </CalcList>
</CalcListCustomization>
```

Report Settings | Configuration | Virtual Panel (Conservation Only) | Trend Analysis
Other | LoanCraft Only Cutover and Cutoff Dates
- Cutover Date for Requesting New Returns: January 1
- Cutoff Date for Using Old Returns (Date they are no longer allowed): April 15
- Cutover Date for Requesting New W2: January 1
- Cutoff Date for Using Old W2 (Date they are no longer allowed): February 1
- Cutover Date for Requesting New 1099: January 1
- Cutoff Date for Using Old 1099 (Date they are no longer allowed): February 1

FIG 11

| Setting | Conservative | Moderate | Optimistic |
|---|---|---|---|
| Level Display Name | Conservative | Standard | Broad |
| Standard Group | | | |
| Minimum Liquidity Ratio | 4.00 | 1.50 | 1.00 |
| Liquidity Minimum Cash | 1,000.0 | 1,500.0 | 100.00 |
| Profit/Loss Requirement On | ☒ | ☒ | ☒ |
| Profit/Loss Requirement Month | 1.00 | 1.00 | 1.00 |
| Profit/Loss Percentage Tolerance | 50.00 | 30.00 | 10.00 |
| Count Inventory in Assets | ☒ | ☒ | ☒ |
| Trend Analysis Method | Standard Averaging ▼ | Standard Averaging ▼ | Standard Averaging ▼ |
| Assume Liquid for K1 Only Income Sources | Not Available | ☒ | ☒ |
| Exclude Negative Non SelfEmployment Business | ☒ | ☒ | ☒ |
| Require 100% Ownership of 1120 Business in order to Count as Income | ☒ | ☒ | ☒ |
| If importing business data to Analysis, method to use | Non-decreasing only ▼ | Non-decreasing only ▼ | Import all unadjusted ▼ |
| Do not subtract other income | ☒ | ☒ | ☒ |
| Do not subtract short-term debt | ☑ | ☑ | ☑ |
| Add back short-term debt if consistent | ☑ | ☑ | ☑ |

FIG. 14A

| Virtual Panel (Conservatism Range) | |
|---|---|
| Conservative | $25,695.72 |
| Standard | $33,406.95 |
| Optimistic | $34,824.68 |
| Range is 15%. This report has a fairly wide range and should be reviewed. | |

FIG. 14B

Income Report

File ID: FigTest.AG.1 Applicant(s): Alan George
Report Date: 6/5/2017
Trend Analysis Setting: Conservative
Calculation Structure: Fannie

Income Summary

Qualified Monthly Income: $24,727.14

Documented sources exceed 1084 analysis by $4,052.17. Shows documented business, rental, and employment (trend analysis in calculations, where applicable) 2015 Line 32 + (28d+29d) in Schedule E: 348,773. Business Return total: 353,865. Difference: -4,090. 2014 Line 32 + (28d+29d) in Schedule E: 255,060. Business Return total: 258,060. Difference: -3,000. 2015 Line 28a in Schedule E: 4, Count of Schedule E Businesses: 4, Items match. 2014 Line 28a in Schedule E: 4, Count of Schedule E Businesses: 4, Items match. 2015 Line 12 in 1040: 81,528, Schedule C total: 81,528, Items match. 2014 Line 12 in 1040: 68,718, Schedule C total: 68,718, Items match. 2015 Line 26a on Schedule E: 30,212, Total rent from property schedules line 3: 30,212, Items match. There are 2 unattached income documents Includes Royalties: 1

FIG. 14C

| Documented Sources | |
|---|---|
| Pension for Alan George<br>Documented by 1040 2014, 1040 2015, using calculation method 'Tax Returns' (Calc Pension TaxReturn) | $1,209.50 |
| Business - Bell Boats<br>Owned by Alan George. Documented by K1 1065 2014, K1 1065 2015, 1065 2014, K1 1065 2015, 1065 2015, K1 1065 2015, using calculation method '1065 w K1' (Calc Business 1065K1) | $5,220.62 |
| Business - Dell Davots<br>Owned by Al George. Documented by 1120S 2014, K1 1120S 2014, 1120S 2015, K1 1120S 2015, using calculation method '1120S w K1' (Calc Business 1120SK1) | $0.00 |
| Dividend - Dividends<br>Documented by Portfolio Statement Dividend, 1040 2014, 1040 2015, using calculation method 'Standard' (Calc Dividend TaxReturn) | $416.67 |
| Rental Income for Alan George<br>Documented by 1040 2014, 1040 2015, using calculation method 'Standard' (Calc Rental Property Gross 1040 NR) | $2,426.00 |
| Business - Cargills Carts<br>Owned by Alan George. Documented by 1065 2014, 1065 2015, K1 1065 2014, K1 1065 2015, using calculation method '1065 w K1' (Calc Business 1065K1) | $1,989.95 |
| Business - Edison Electronics<br>Owned by Alan George. Documented by 1065 2014, K1 1065 2014, 1065 2015, K1 1065 2015, using calculation method '1065 w K1' (Calc Business 1065K1) | $8,203.75 |
| Business - Consulting<br>Owned by Alan B George. Documented by 1040 2015, 1040 2014, using calculation method 'Standard' (Calc Business 1040) | $5,260.65 |

FIG. 14D

| Pension -- Taxable | |
|---|---|
| 2014 | |
| Total Amount | $0.00 |
| Taxable Amount | $14,574.00 |
| Exempt Amount | $0.00 |
| 2014 Subtotal | $14,574.00 |
| 2015 | |
| Total Amount | $0.00 |
| Taxable Amount | $14,514.00 |
| Exempt Amount | $0.00 |
| 2015 Subtotal | $14,514.00 |
| Using 2015 amount of $14,514.00 because it is less than the 2014 amount.<br>Monthly income: $1,209.50 | |
| Annual Amount | $14,514.00 |
| Monthly Income | $1,209.50 |

FIG. 14E

| Business Analysis for Bell Boats | | | |
|---|---|---|---|
| Year | +/- | 2015 | 2014 |
| Ordinary Income (Loss), Net Rental Real Estate Income (Loss), Other Net Rental Income (Loss) Line 1, 2, and 3 | + | 144,745.00 | 108,308.00 |
| Total from Adjustments Chart See Adjustment Analysis on Following Page | | -151,891.00 | -126,222.00 |
| Percentage of Capital Line J - Capital - Ending % | | 42% | 42% |
| Proportionate Share of Adjustments to Business Cash Flow Total from Adjustments Chart times (X) "Percentage of Capital" | | -63,794.22 | -53,013.24 |
| Subtotal Previous two lines | | 80,950.78 | 55,294.76 |
| Distributions Line 19 | | 63,000.00 | 82,000.00 |
| Lesser of 'Subtotal' or 'Distributions' | + | 63,000.00 | 55,294.76 |
| Guaranteed Payments to Partners Line 4 | + | 4,000.00 | 3,000.00 |
| Total | | $67,000.00 | $58,294.76 |
| Monthly | | $5,583.33 | $4,857.90 |
| Using $62,647.38, which is average of previous two years, because the 2015 amount is more than the 2014 amount. Monthly income: $5,220.62 | | | |

FIG. 14F

| | |
|---|---|
| Since 2015 is greater, using average of the two years. | $2,647.38 |
| Divided by | 12 |
| Amount to Use | $5,220.62 |
| | |
| Alternative Scenarios | |
| Conservative | 5,220.62 |
| Standard | 9,049.05 |
| Optimistic | 9,615.79 |
| | |
| Impact of Distribution Limit | |
| Income if distribution limit were not applied | $5,968.56 |
| Resulting Income Difference | $747.94 |
| | |
| Liquidity Analysis | |
| Assets | |
| Cash | $312,192.00 |
| Accounts Receivable | $0.00 |
| Inventories | $251,400.00 |
| Tax Exempt Securities | $25,411.00 |
| Other Current Assets | $0.00 |
| Total Current Assets | $589,003.00 |
| Assets Net of Inventory | $337,603.00 |
| Liabilities | |
| Accounts Payable | $41,500.00 |
| Short Term Debt | $88,014.00 |
| Other Current Liabilities | $13,212.00 |
| Total Current Liabilities | $142,726.00 |
| Inventory to Income Ratio | 72.89% |
| Threshold to Use Quick Ratio | 100.00% |
| Since inventory is at or below the threshold ratio to income, using the current ratio | |
| Current Ratio | 236.54% |
| Ratio Threshold to Accept Earnings | 400.00% |
| Ratio of assets to liabilities is below threshold. | |

FIG. 14G

| Business Return Adjustment Analysis for Bell Boats | | | |
|---|---|---|---|
| Year | +/- | 2015 | 2014 |
| Form 1065 Main | | | |
| Ordinary (Income) Loss for Other Partnerships, Estates, and Trusts<br>Line 4 | - | 51,474.00 | 25,451.00 |
| Nonrecurring Other (Income) Loss<br>Line 7 | - | 15,414.00 | 16,971.00 |
| Depreciation<br>Line 16a | + | 3,748.00 | 4,943.00 |
| Depletion<br>17 | + | 0.00 | 0.00 |
| Amortization / Casualty Loss | + | 0.00 | 0.00 |
| Form 1065 L | | | |
| Mortgage or Notes Payable in Less than 1 Year<br>Line 16d | - | 88,014.00 | 88,014.00 |
| Form 1065 M | | | |
| Travel and Entertainment | - | 737.00 | 729.00 |
| Total | | ($151,891.00) | ($126,222.00) |
| Monthly | | ($12,657.58) | ($10,518.50) |

FIG. 14H

| Trend Analysis - Conservative | |
|---|---|
| Income Decreased. 2014 amount is greater than 2015 amount by | $21,466.40 |
| 2015 amount as percentage of 2014 amount. | 27.15% |
| Threshold percentage for discounting all income. | 40.00% |
| Item falls below threshold. Zero income will be used. | |
| Amount to Use | $0.00 |
| | |
| Alternative Scenarios | |
| Conservative | .00 |
| Standard | 850.99 |
| Optimistic | 1,701.98 |
| | |
| Impact of Distribution Limit | |
| Income if distribution limit were not applied | $538.49 |
| Resulting Income Difference | $538.49 |

FIG. 14I

| Liquidity Analysis | |
|---|---:|
| Assets | |
| Cash | $151,012.00 |
| Accounts Receivable | $0.00 |
| Inventories | $1,841.00 |
| Tax Exempt Securities | $15,414.00 |
| Other Current Assets | $0.00 |
| Total Current Assets | $168,267.00 |
| Assets Net of Inventory | $166,426.00 |
| Liabilities | |
| Accounts Payable | $18,474.00 |
| Short Term Debt | $40,000.00 |
| Other Current Liabilities | $0.00 |
| Total Current Liabilities | $58,474.00 |
| Inventory to Income Ratio | 1.60% |
| Threshold to Use Quick Ratio | 100.00% |
| Since inventory is at or below the threshold ratio to income, using the current ratio | |
| Current Ratio | 284.62% |
| Ratio Threshold to Accept Earnings | 400.00% |
| Ratio of assets to liabilities is below threshold. | |

FIG. 14J

@LoanCraft

| Personal Return Analysis | | | |
|---|---|---|---|
| Year | +/- | 2015 | 2014 |
| 1040 | | | |
| W2 Income From Self Employed | + | 0.00 | 0.00 |
| Schedule A | | | |
| Schedule B - INTEREST AND DIVIDENDS | | | |
| Interest Income<br>Line 4 | + | 0.00³ | 0.00⁴ |
| Dividend Income<br>Line 6 | + | 0.00⁵ | 0.00⁶ |
| Schedule C - SOLE PROPRIETORSHIP | | | |
| Net Profit or Loss<br>Line 5 | + | 61,528.00 | 65,718.00 |
| Nonrecurring Other (Income) Loss or Expense<br>Line 6 | - | 0.00 | 0.00 |
| Depletion<br>Line 12 | + | 0.00 | 0.00 |
| Depreciation<br>Line 13 | + | 0.00 | 0.00 |
| Meal and Entertainment Exclusion<br>Line 24b | - | 770.00 | 1,716.00 |
| Business Use of Home<br>Line 30 | + | 0.00 | 0.00 |
| Business Miles<br>Line 44a | + | 2,369.76 | 2,297.02 |
| Amortization or Casualty Loss<br>Page 2, Line v | + | 0.00 | 0.00 |
| Schedule D - CAPITAL GAINS AND LOSSES | | | |
| Recurring Capital Gain (Loss)<br>Line 15 | + | 0.00 | 0.00 |
| Schedule E - SUPPLEMENTAL INCOME AND LOSS | | | |
| Royalties<br>Line 23b | + | 0.00⁷ | 0.00⁸ |
| Schedule E - ROYALTIES | | | |
| Total Expenses | - | 0.00 | 0.00 |
| Depletion | + | 0.00 | 0.00 |
| Schedule F - FARM INCOME | | | |
| Non-Tax Portion Ongoing Co-op and CCC Payments<br>Lines 3a minus b through 6a minus b | + | 0.00 | 0.00 |

FIG. 14K

| Research Prompts | | | |
|---|---|---|---|
| Prompt | Trend | Last Year | Documented |
| Document income and expenses from businesses. If the customer owns less than 25% of the business, you may use K1's to calculate income. Otherwise you should request returns or transcripts. (Business) | $25,201.46 | $29,147.92 | $15,414.32 |
| Verify income from W2 employment. Note that if the borrower has 1120S income, some or all the W2 may be derived from the distributions of the business. (Employment) | $7,012.08 | $7,012.08 | $0.00 |
| Document Schedule C Income. (Business) | $5,063.17 | $5,063.17 | $5,268.65 |
| Document existence of the accounts on which the interest is earned and confirm that the balances have not significantly decreased. Subtract any interest income from seller-financed mortgages that have less than three years remaining in the contract or that is unstable because of delinquent repayment. (Interest) | $1,586.25 | $1,940.25 | $0.00 |
| Taxable Pension: Assure that distributions are likely to | $1,209.50 | $1,209.50 | $1,209.50 |

FIG. 14L

| Required Documents for Additional Income Sources | |
|---|---|
| Employment | 2016 W2 / 2015 W2 |
| Interest | Portfolio Statement |
| Interest | Portfolio Statement |
| Royalties | Custom Document |

FIG. 14M

| Impact of Distribution Limit | |
|---|---|
| Decrease in income resulting from applying distribution limit for Bell Boats; Dell Davots; Cargills Carts; | ($2,118.24) |
| Increase in income resulting from not applying distribution limit for Edison Electronics; | $8,203.75 |

FIG. 14N

| Potential for Further Documentation | |
|---|---|
| Documented<br>Income from sources documented in this report. | $24,727.14 |
| Projected from Additional Research<br>Amount available from reasonably available other income sources. | $7,490.12 |
| Projected from Extended Additional Research<br>Assumes all possible remaining items documented to estimated outcome. | $3,001.71 |

METHOD AND SYSTEM FOR PERFORMING INCOME ANALYSIS FROM SOURCE DOCUMENTS

PRIORITY CLAIM

The present application claims priority to U.S. Provisional Application No. 62/479,895 filed on Mar. 31, 2017. The contents of that application are hereby incorporated by reference in their entirety.

TECHNICAL FIELD

The present disclosure relates generally to system and method to determine income, more specifically, this disclose is directed toward a method and system to integrate multiple data sources for income and provide a range of income values for evaluation.

BACKGROUND

In a variety of industries, it is often deemed necessary to determine the monthly income of an individual. For example, in the lending industry, regulations require that lenders accurately assess the ability of an individual to repay a loan, and one of the key elements in this assessment is the amount and nature of the individual's income. Standard accepted practice for the calculation of income is to use various source documents provided by an individual, and to derive income calculations from information on such forms. There are a wide variety of types of income source documents. Most common are paycheck stubs, W2 forms, and tax returns. Calculation of income from these sources requires time consuming processing steps, grouped into the following: a) documents must be collected from individuals in a usable and storable format; b) data must be extracted from these documents in some form; and c) data must be placed into relevant calculations.

Extraction of data from income source documents in existing systems present several problems. First, it is time consuming and difficult to extract the data. Data is often contained on paper documents, or images of paper documents. Extraction must often be done through manual data entry to paper records or spreadsheets. Less often, automated tools are used to scan data, but the accuracy of these tools is not always 100%, and automated tools are often unable to extract all necessary fields. Second, extraction is an error prone process. Obviously, errors in data extraction can lead to incorrect calculations of income. Third, it is often difficult and time consuming to perform quality control or quality assurance on extracted data.

It is troublesome to split out and separate income source documents into smaller chunks, because there are no easy tools to do so. Separating out such documents manually is time consuming. It is also troublesome for users to upload and specify the type of documents.

There are also several problems with methods for making and documenting income calculations. First, there is often inconsistency in the method of calculation, which can lead to a range of problems, including inconsistent application of credit policy, exposure to discrimination claims, and other issues. Second, there is often a substantial amount of cost and time spent on training of a range of individuals with respect to how to make income calculations. Third, there are issues of inconsistent documentation. The existing systems there result in substantial time and energy spent on the process of income calculation, often by highly paid and scarce resources such as underwriters.

Thus, there is a need for a system that allows automatic determination of income from a package of source documents. There is also a need for a system that allows integration of different methods of determining income levels to provide better analysis. There is a further need for a system that provides sufficiently accurate determination of income levels that gives an option for operator validation.

SUMMARY

One disclosed example is a method of determining an income calculation. An image of a document package of income related documents from a document server is provided. The documents in the document package are separated based on the image of the document pages via a splitting module. The separated documents are classified via a classification module. An automated scanning tool is selected based on the document classification on at least one of the separated documents. Income related data is determined from the at least one separated document via the selected automated scanning tool. An interface is provided for the input of configurations for a plurality of calculation models. The confidence of the determined income related data based on the selected automated scanning tool and the income related data is determined. A plurality of income calculations is determined based on the determined income related data and the configurations for the plurality of calculation models via a calculation engine. A report including the plurality of income calculations is generated. An interface is generated displaying the report on a display device.

Another disclosed example is a system for providing analysis of income calculations. The system includes an electronic network and a document server coupled to the network. The document server provides an image of a document package of income related documents. A document storage device is coupled to the network to store the image of the document package. The system includes a splitting module executed on a splitting server coupled to the network. The splitting module separates the documents in the document package based on the image of the document pages. A classification module is executed on the splitting server that classifies the separated documents. An optical recognition server includes a plurality of automated scanning tools. The optical recognition server is coupled to the network. The optical recognition server selects an automated scanning tool based on the document classification on at least one of the separated documents. Income related data from the at least one separated document is determined by the selected automated scanning tool. An analyst workstation is coupled to the network. The system includes an analyst workstation having a display generating an interface for the input of configurations for a plurality of calculation models. A determination server is coupled to the network. The determination server is operative to: determine the confidence of the determined income related data based on the selected automated scanning tool and the income related data; determine a plurality of income calculations based on the determined income related data and the configurations for the plurality of calculation models via a calculation engine; and generate a report including the plurality of income calculations. The report is displayed on the display of the analyst workstation.

The above summary is not intended to represent each embodiment or every aspect of the present disclosure.

Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIGS. 6A-6B are a screen shot of an interface used to confirm data capture during the quality assurance step in FIG. 5;

FIG. 8 is an example XML data structure for tax line calculations used in the process of calculating an income result;

FIG. 9 is an example XML data structure for the selection of configuration data for the process of calculating an income result;

FIG. 10A-10D are screen shots of different settings interfaces that allows selection of configuration data for the process of calculating an income result;

FIG. 11 is a screen shot of a settings screen that allows selection of a model for a virtual panel;

FIG. 14A-14N are example reports produced by the system in FIG. 1;

Figure 1:
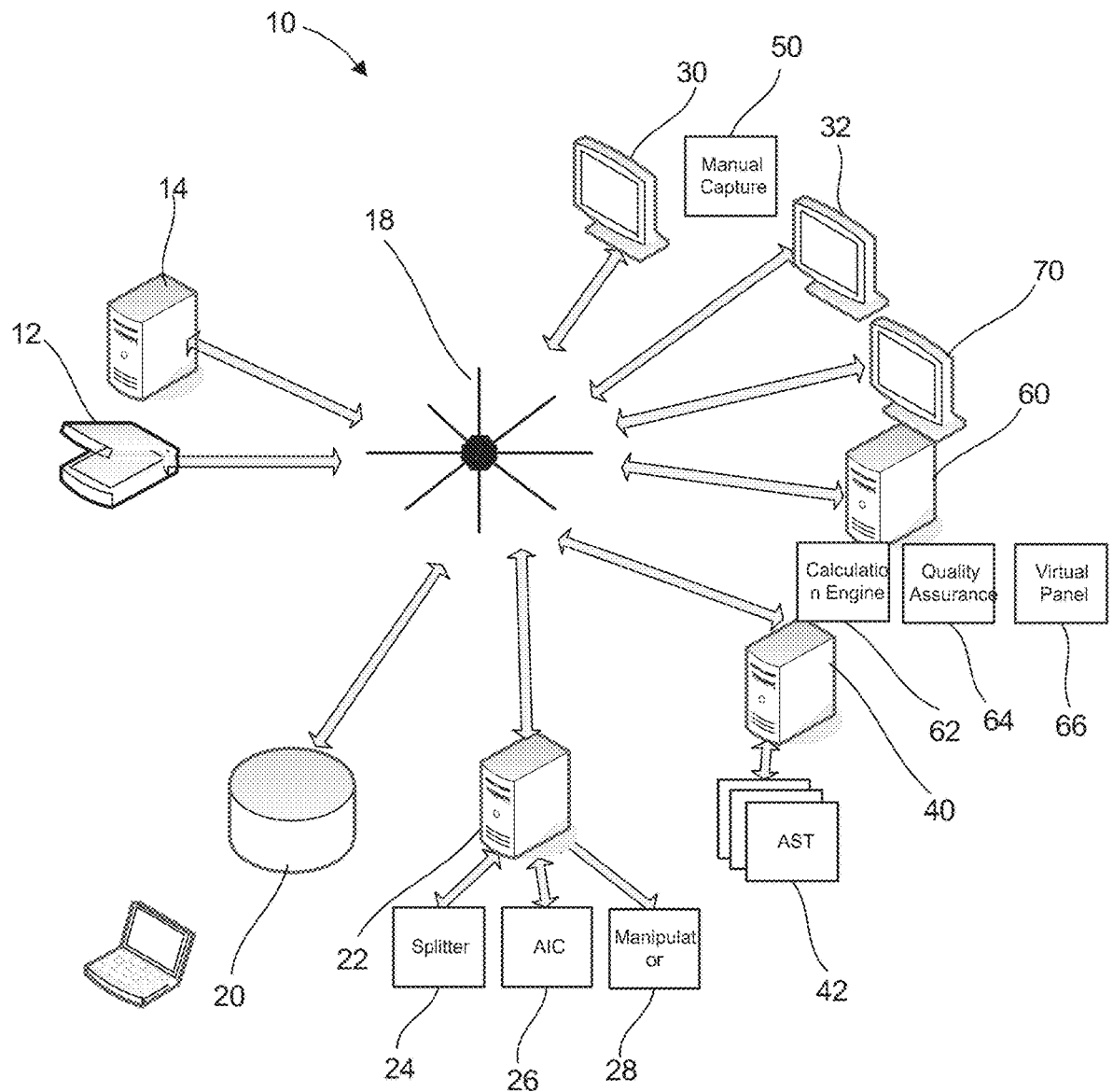
FIG. 1 is a block diagram of the example system that determines an income calculation.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

FIG. 1 is a block diagram of an example system 10 that provides income determination calculations. The system 10 includes a scanner 12 that may convert paper document packages into electronic data. For example, the scanner 12 may be coupled to a document recognition server that is part of a web-based system which allows the user to upload image documents of a variety of types. For example, a user may upload a PDF file which contains multiple tax returns and schedules. An example of such a package might be a single PDF document that contains Form 1040s for two different years, Form 1065s for two different years, and Form K-1s for three different businesses, for two different years.

The system 10 may also include a document server 14 that stores previously scanned document packages. The scanner 12 and the document server 14 are connected to a network 18.

The network 18 may include any publicly accessible network environment, such as the Internet in this example, which includes network components, such as public servers. It should be noted, however, that the ensuing descriptions of the various functionalities relating to servers are generally applicable to the network devices coupled to the wide area network and thus the remaining description will simply refer to either one as servers unless noted otherwise.

In this example, the network 18 may also be a local area network (LAN) environment employing any suitable interface mechanisms and communications technologies including, for example telecommunications in any suitable form (e.g., voice, modem, and the like), Public Switched Telephone Network (PSTNs), Ethernet-based Packet Data Networks (PDNs), combinations thereof, and the like. Moreover, the local area network may be made up of one or more interconnected LANs located in substantially the same geographic location or geographically separated, although the local area network may include other types of networks arranged in other configurations. Moreover, the local area network may include one or more additional intermediary and/or network infrastructure devices in communication with each other via one or more wired and/or wireless network links, such as switches, routers, modems, or gateways (not shown), and the like, as well as other types of network devices including network storage devices.

The system 10 includes a document database 20 that stores images of document packages from the scanner 12 or the document server 14. The document database 20 also includes related data that is determined from the documents in the document packages as will be described below. The document database 20 may be accessed by different application servers via the network 18. An example application server is a document splitting server 22 that includes a splitting component 24 that identifies and separates documents from a source document package. The document splitting server 22 includes an automated image classifier 26 that identifies separate documents and a document manipulator module 28 that is used to extract portions of a document package into separate documents.

Different operators may provide data input and validation via operator workstations 30 and 32 coupled to the network 18. The workstations 30 and 32 are provided interfaces to input missing data and confirm the values of automated data determined from the document package. Although only two operator workstations are shown in FIG. 1, it is to be understood that there may be any number of workstations for operators of the system 10.

The processed documents from the document splitting server 22 are generally stored on the document database 20 and analyzed by an optical character recognition server 40. The optical character recognition server 40 includes a set of automated scanning tools (AST) 42. The automated scanning tools 42 allow data to be captured from a scanned and separated document. The data is stored in the document database 20 for further analysis.

Each of the operator workstations 30 and 32 execute a manual capture application 50 that generates an interface to facilitate the manual entry of documents by the operators. The interface displays an image of the scanned document and different input fields to facilitate the manual entry of data from the documents.

After data is determined from the documents in the document package, an income determination server 60 calculates an income from running a calculation engine 62. The server 60 may produce a report on the calculated income. The determination server 60 includes a quality assurance module 64 that reviews the data to determine the accuracy of the calculated income. The determination server 60 also includes a virtual panel module 66. The virtual panel module 66 allows review of different income calculations based on different models. An analyst workstation 70 includes a display that allows the display of various interfaces to configure the models of the virtual panel module 66 and calculation engine 62. The resulting reports on calculating income may also be displayed on the analyst workstation for use by an analyst as will be explained below. It is to be understood that the workstations 30, 32 and 70 may be interchangeable and may have allow users to access a variety of described functions for the system 10.

It is to be understood that all of the functions of the servers 22, 40 and 60 may be performed on a single server. It is also to be understood that there may be multiple servers such as the servers 22, 40 and 60 to make income calculations based on numerous document packages.

The example system 10 in FIG. 1 provides an integrated framework for human and automated processes that use source documents for income analysis and generate accurate estimates of the monthly income of a person. Data is grouped into "files," which may be assigned to one or more persons seeking a loan or other financial transaction. For each file, source documents are uploaded to the system 10 via either a human user interface or an automated transactional interface such as the scanner 12.

Users need not specify the type of document, and may upload the documents via the interface such as the scanner 12 in "packages" or groups of documents. Alternatively, the system 10 can transmit via an application program interface that may be executed by a document server 14. The "splitting" component 24 executed by the document splitting server 22 separates and identifies various source documents within the uploaded package. The splitting component 24 performs three functions: identification of how the pages of a package should be separated, creation of smaller digital documents from the larger group, which contain a single document, though potentially with multiple pages, such as a 1040 tax return, and identification of the document type.

The splitting component 24 first attempts to perform document identification in an automated fashion. The automated image classifier 26 is used to read each page of the large package and attempt to identify it. A variety of automated image classifiers such as ABBYY and Tesseract may be used for this process. The document manipulator module 28 is used to extract specified portions of the document in to smaller documents. A variety of document manipulators such as iTextSharp or aSpose may be used for this process. The system 10 provides a suggestive and efficient way for an operator to verify that the proper splitting is done as will be explained below There are two prompts which identify that a document package needs to be reviewed. First, the automated image classifier 26 provides success or failure feedback. If the classifier 26 provides any failure feedback, the system 20 places the document into a review queue at an operator station such as the operator stations 30 and 32. Second, completeness checks from future steps in the process indicate the possibility of missed documents within the package. A simple example is one where two years of tax returns are expected but only one is found. Quality assurance procedures would lead to an attempt to find the other year inside the package. Another example would be when business income data reported on a 1040 form does not match the total of the collection of business returns that have been submitted. The system 10 provides information about an imbalance, and suggests that further documents are necessary. The system 10 provides a user interface to identify pages that belong to a document within the larger package, specify the type of document identified, and create a separate digital document file for the identified document After successful "splitting," each source document is separated within the system 10. The system 10 proceeds to accurately and completely capture and store important data from each source document in the file. The automated component of this function is achieved through the use of various existing automated scanning tools, such as application on the optical character recognition server 40. It is to be understood that a variety of data scanning tools may be used.

The optical recognition server 40 executes one of a series of automated scanning tools 42. Configuration of selected automated scanning tools 42 may be required for each type of source document. For example, configuration files for each type of tax return form will be created in the format necessary for a specific automated scanning tool. Each source document is submitted to one of the automated scanning tools (AST) 42 and the results are saved. The system 10 measures two key elements of the AST, identified as yield and accuracy. Yield refers to the portion of data elements for which the AST is able to obtain a value.

Accuracy refers to whether the AST accurately captures the data value. Each data element identifies the source of its original stored account. Yield is measured by identifying all data elements which indicate they were found by an automated source, divided by the total number of data elements. Accuracy is measured by reviewing the subset of data elements found by the automated source. With this subset, the original stored value is compared to the final confirmed value. Accuracy is the number of fields that match divided by the total fields found by the automated source.

Yield and accuracy are affected by three factors: the quality of the data in the scanned image, the proficiency of the AST in capturing the data, and the appropriateness of the configuration. As a general principle, increasing yield may decrease accuracy, and vice versa. As will be explained below, the system provides methods for assessing the yield and accuracy at a data element level. Importantly, the framework allows for individual confidence assessment of each data element captured from the source document. This confidence assessment has two senses: There is aggregate measurement of the systems success for each data field, determined by calculating accuracy over time. For a given data element, the average accuracy performance over time contributes to the general confidence about the data field. In addition, AST tools provide individual confidence measures. For example, for a given data element, suppose a number is slightly smudged on the original document. The AST will report a lower confidence value for its data extraction. The smudge is one sort of reason, other factors include general scan quality, handwriting issues, tilt or skew of an image, and general image quality The system 10 facilitates the data capture that operators may perform from any review needed from the source document. Thus, an operator may capture data to increase assurances that the data captured by the AST is accurate. An operator may also capture data in instances the AST fails to provide a value. A unique feature of the system 10 is that the data capture from manual entry by an operator is integrated into the process such that the process flow may provide success results for high or low levels of assessment by the AST. The internal AST level of success is opaque to outside users of the system 10.

A manual capture application may be executed by an operator workstation such as the workstation 30. The manual data capture application 50 provides the following routine. An operator is presented with a data capture screen on a workstation, such as the workstation 30, that asks for the operator to either enter or confirm data from a source document. In this example, the relevant image of the document is placed on screen next to the data elements that are being extracted. The manual data capture application 50 determines, at a data element level, whether a field needs confirmation or entry. The operator (such as a data capture analyst (DCA)) provides the analysis via the manual data capture application 50. When confirmation is required, the manual data capture application 50 provides an interface for the operator to either confirm or correct the value originally stored in the system 10. When entry is required, the manual data capture application 50 provides a blank field in which the operator can enter the correct value.

Thus determining a particular data element follows the processes of attempted capture by an AST, confirmation or capture by the operator, confirmation or capture by a second operator, and resolution of conflicted entry by an operator. The system 10 automatically identifies the correct sequence for each data element, using the following data capture success factors: general confidence of AST for the data element, particular confidence of the AST for the data element, significance of the data field for the support of other data fields, consistency of the network of data fields, and demonstrated proficiency of the operator who performs the data entry. This variety of factors assures maximal accuracy, with appropriate efficiency in the application of manual effort. In some cases, a data element will be captured using "blind double data entry," which means that separate operators will each enter a value, and only if this value matches will it be accepted by the system 10. In other cases, given various success attributions by the other data capture success factors, less manual input is required to accurately capture a data element, and the system 10 appropriately adjusts the workflow.

The example system 10 produces an income calculation by taking a set of data captured from source documents and applying the set of data to a calculation configuration to generate a calculation result (CR). The generation of the set of data is explained above. The calculation configuration consists of a group of configurations and implemented specifications that fall within the following categories: a) a variety of calculation methods for each income source type, where examples of income source types include business income, rental income, trust income, income from employment, and others; b) a variety of aggregate assumptions which may vary according to calculation entity, where examples of calculation entities include Fannie Mae, Freddie Mac, and others; and c) a variety of customizable configurations which relate to the particular credit or assessment policies of the customer that is requesting the report.

In one example of the system 10, these calculation configurations are accomplished with a combination of .NET framework code and XML configuration files. A calculation result contains at least the following elements: stated calculation of monthly income, individual calculations for each income source, a virtual panel, which lists the calculations that would arise from differing points of view about various decision points (as explained below), research prompts which identify further possible sources of income, checklist for additional documents which might be required, projections of income that might be identified by obtaining additional source documents or information, and appropriate alerts or notices about the methods of calculation which may prompt further research by an analyst.

In this example, the income determination server 60 of the system 10 produces a report as soon as all the necessary data from the source documents in the file has been captured. Thus, the relevant data elements are captured and confirmed. The data elements are then applied to a calculation configuration for an income estimate for the report. The report is generated and may then be displayed on a display on a workstation such as the workstations 30 and 32. After the report is generated, it undergoes an automated function of quality assurance via the quality assurance module 62. The quality assurance module 62 includes algorithms to test completeness and consistency of the calculation. The system 10 tests for completeness by using data within forms that are entered to determine whether further information might be available. For example, if a personal tax return has been loaded, it will indicate a particular level of business income. The system 10 will then review all business sources of income to determine if they match the particular level of income. In the event that the automated quality control process identifies that a file is complete and consistent, the system 10 will automatically mark an income calculation as ready for transmission.

If the system 10 indicates the file is not complete, various measures might be taken by a quality control analyst based on the information from the system 10. For example, the uploaded document packages might be reviewed to determine if they contain business return documents which were not identified during the splitting process. Comments might be added to the report so that the report requestor is alerted to the lack of information, prompting them to submit additional information. The system 10 also allows for requestors to specify whether they want to see "incomplete" or partial reports, or whether they want to restrict the framework from producing a report when there is incomplete data.

The system 10 provides a heuristic vehicle to an analyst for confirmation or adjustment of the calculation result. For example, in the lending industry, underwriters are analysts that confirm income, and will often use evaluative judgment with respect to a wide variety of factors about a loan applicant when making a decision. While the system 10 provides a single calculation for monthly income, it also provides a basis and groundwork for further judgment by an analyst, such as an underwriter.

The system 10 also provides an efficient mechanism for identifying when such judgment is likely to make a significant difference in income analysis. This is accomplished through a mechanism termed a virtual panel. For a self-employed borrower with any complexity in their income, different underwriters will often come up with different answers of income. Different lenders adopt policies that lead to different results. There is also variation from lender to lender, even when selling to the same investor. For example, Lender A may develop a set of calculation criteria for loans they submit to Fannie Mae that is different from the criteria developed by Lender B for the loans they sell to Fannie Mae. An effective system must be flexible and configurable to serve a wide range of customers and policies. The system 10 allows requestors to configure policy settings on a range of underwriting assumptions and principles. In this example, the policy settings may include three different levels, or models termed conservative, standard and optimistic. The labels for these models may be customized depending on how the requestor chooses to use them. When the income calculation is generated, it provides the value generated by each of the three models. For example, the system 10 may indicate that based on the Conservative model, the income is calculated to be about $7,600 less than the Standard model, and about $8,000 less than the Optimistic model.

The system allows for an adjustable setting for two different alert levels, which are based on the percentage of variation with the panel. The alert levels are a predetermined threshold value for income calculations from the models deviating from each other. The requestor can set different messages, depending on which alert level is triggered. This can be used to establish a workflow. Essentially, if various models are in close agreement, then it is highly unlikely that individual judgment will make a significant difference. But if models differ, then individual judgment has more use. Given the cost and scarcity of judgment resources, this provides an important efficiency and economic benefit for operators attempting to evaluate the income data.

Figures 2, 3:
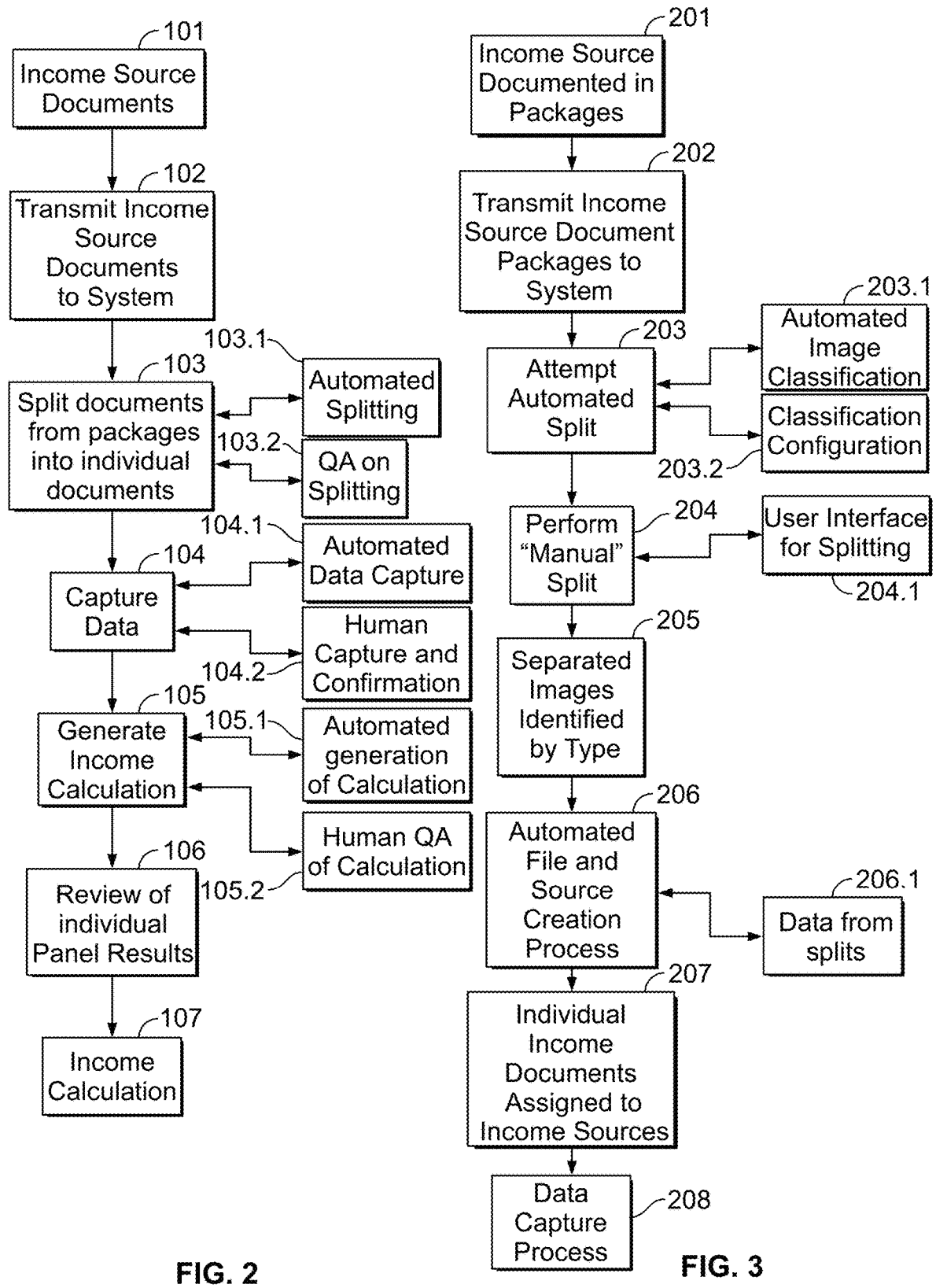
FIG. 2 is a flow diagram illustrating the overall process by which the example system in FIG. 1 transforms income source documents into an income calculation.
FIG. 3 is a flow diagram illustrating how the example system splits large packages of income source documents into separate documents that are identified by document type.

FIG. 2 is a flow diagram illustrating the overall process by which the example system 10 in FIG. 1 transforms income source documents into an income calculation. The system 10 receives source documents for purposes of income determination (101). The income source documents are transmitted to the system 10 and stored in the document database (102). The system 10 splits documents from the packages into individual documents (103). The splitting includes both automated splitting and performance of quality assurance on the splitting. The system then captures the data elements from the documents (104). The data element capture is preferably performed by the automated data scanning tools 42 in FIG. 1. The data element capture may also be augmented by manual capture and confirmation by operators via the manual capture application 50 in FIG. 1. The system 10 then generates an income calculation (105). The calculation is generated automatically by the calculation engine 62 of the determination server 60. This allows an operator to perform quality assurance on the calculation. The system 10 then generates a review by a virtual panel and generates results from the virtual panel review (106). The system 10 then generates an income calculation report (107).

FIG. 3 demonstrates the splitting process explained above, where packages of source documents are separated into individual computer files for each type of document, and indexed or identified according to income document source type. For example, a user might submit a PDF package of a collection of tax return documents such as 1040s, 1065s and K1s for two years. The outcome of the splitting process in FIG. 3 is that each return form is moved into a separate file, and labelled. One such document file might be a 1065 form for a particular business for the year 2017. The system 10 receives an income source document 201 in PDF or other files in which many different types of documents are contained in one computer file. As explained above, such a file may be received from an outside source such as a document server 14 or generated through the scanner 12 from paper documents.

The first step in the process is to load and store document packages in a database that stores and codes index file, such as the document database 20 in FIG. 1 (202). The documents are then analyzed by the automated image classifier (AIC) 26 in FIG. 1 (203). The automated image classifier 26 may be any of a variety of software or hardware solutions 203.1, and classification configurations 203.2, which identify the logic used to identify various forms. This step will vary in effectiveness according to the strength of the AIC, the appropriateness of the configurations, and the clarity and nature of the source document package being analyzed. The system 10 produces a status as to whether the split was successful or not. As explained above, the system 10 may adapt to varying degrees of success by the automated splitting process to produce the income calculation.

If the automated splitting is unsuccessful, the system 10 executes the manual application 50 in FIG. 1 (204) to allow an analyst to reviews document packages at a workstation. Future quality assurance outcomes may also prompt human review of a submitted package. As explained above, one example is when two years of tax returns are expected but only one year is found. Another example explained above is where business income data reported on a 1040 does not match the total of the collection of business returns that have been submitted. The manual application 50 thus presents a user interface 204.1 on a workstation, such as the workstation 30, with three primary components: a visual representation of the document package, a user interface for identifying particular pages and/or ranges of pages that should be separated, an ability to identify the type of income source document that is identified, and create a separate digital document file for the identified document. In this example, all of these components are presented on the same screen to the operator on the workstation 30 in FIG. 1.

After the document package has been properly divided into individual source documents, and their types have been identified, the system 10 creates the data structures for each type of source documents, so that the components of a document source file may be analyzed (207). This facilitates automated generation of calculations after the data capture step. Each individual source document is submitted to the data capture process (208).

Figure 4:
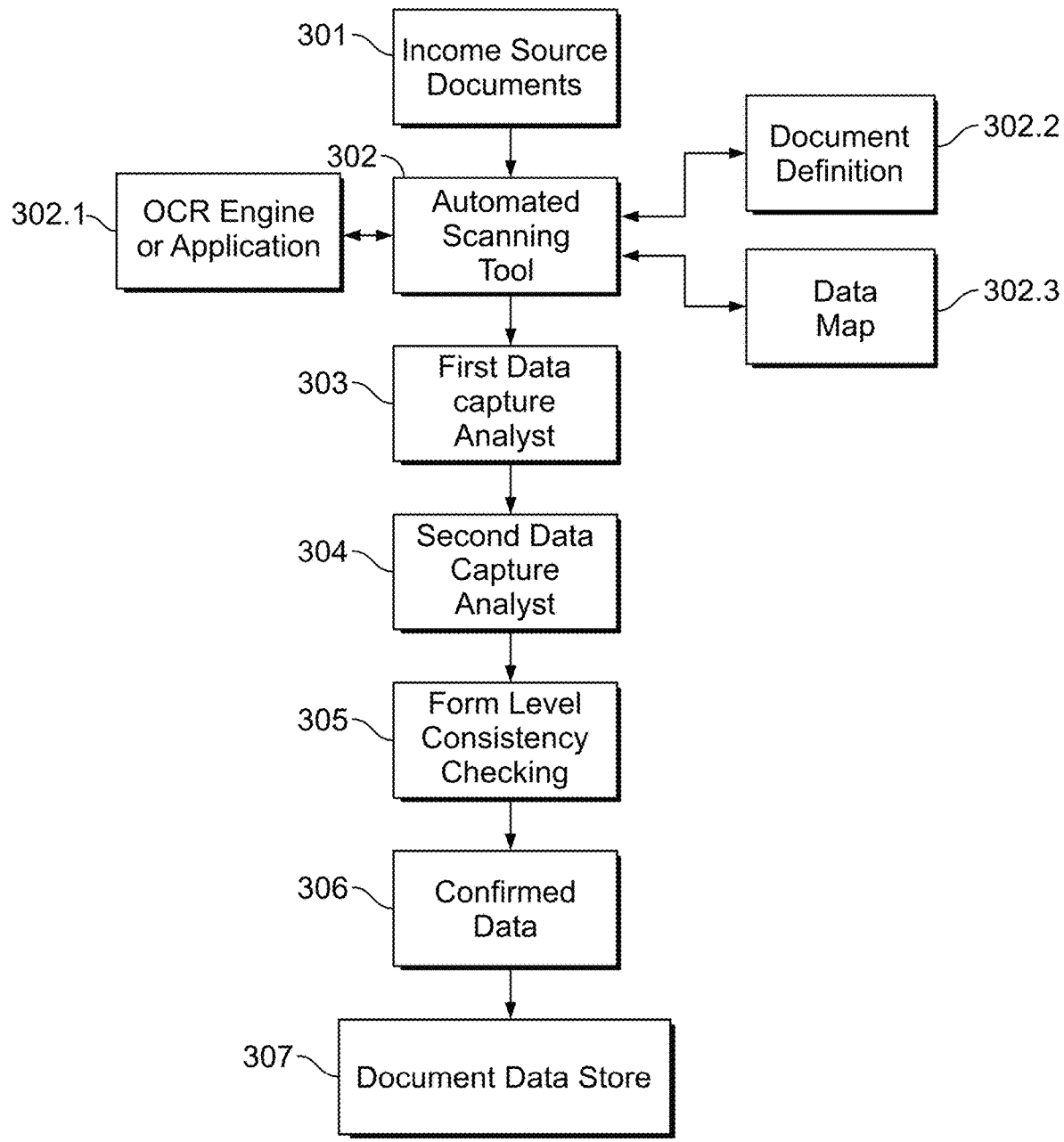
FIG. 4 is a flow diagram showing how the example system captures and transcribes data from income source documents.

FIG. 4 is a flow diagram showing how the example system 10 captures and transcribes data from income source documents through a data capture process. The process is implemented for each income source document 301 that is generated by the splitting process in FIG. 3. Each document is submitted to the Automated Scanning Tool (AST) from the set of automatic scanning tools 42 in FIG. 1 (302). The automated scanning tool consists of three components, an optical character or data recognition engine, 302.1, a document configuration file 302.2, and a data map 302.3. The optical character engine 302.1 performs automated character recognition or data recognition, which may be any of a number of tools, sometimes referred to as OCR tools (Optical Character Recognition). The document configuration files 302.2 identify the desired fields and the methods to find and identify the fields in a document. The data map 303.3 identifies how captured data is to be transferred and stored in the document database 20 in FIG. 1. The process than provides a user interface for a first operator such as a data capture analyst to perform blind data entry or value confirmation (303). Depending on the success of the automated recognition and the nature of the data, the data capture analyst may either perform blind data entry, or value confirmation. The user interface provides an appropriate function for either task. The logic for identifying which is function to be used is identified below.

Depending on the success from steps 302 and 303, an interface for a second data capture analyst may be generated on a workstation such as the workstation 32 (304). The second data capture analyst also may be asked to use blind data entry, or perform confirmation. The system 10 tracks whether a particular data element requires this, and also prompts data capture analysts to enter the appropriate values through an efficient queue management system. The logic performed in steps 302 to 304, are identified in detail below and in reference the process in FIG. 4. The system performs two types of consistency checks around all submitted forms for the file (305). For any set of personal and business returns, there are a number of interconnected data elements. For a simple example, within a form 1040, lines 7 through 21 should add to line 22. Thus the system 10 uses a rule to compare these lines, and presents a message if they are not consistent. Further, there is interconnectedness between schedules. For example, the values reported on a schedule E are connected to line 17, and to values from various K1 and other forms. The system 10 uses rules to determine consistency between data elements in particular forms. The operators performing blind data entry or confirmation through the generated interfaces assures that each data element will be confirmed (306). The confirmation ensures a very high degree of accuracy, where accuracy is defined as the likelihood that the data stored for a particular element matches the data on the form. The data is then stored in the document database 20 in FIG. 1 (307).

A key element of the system 10 is that it assures a high degree of accuracy. One method used for this is multi-sourced capture of data, where the source is either operator entered or automated. The process in FIG. 4 includes double-blind data entry through the interfaces generated in steps 303 and 304. Blind data entry means that the data capture analyst enters a value without knowledge of what other process components have entered. For purposes of assuring accuracy, this creates "double blind" confirmation. When two different sources enter the same value, without knowledge of the result of the other source, a much higher level of accuracy is achieved. The system 10 provides a structured and systematic way to determine when double blind data entry should be used, and through the interfaces, facilitate users in the process to implement the double blind data entry.

Figure 5:
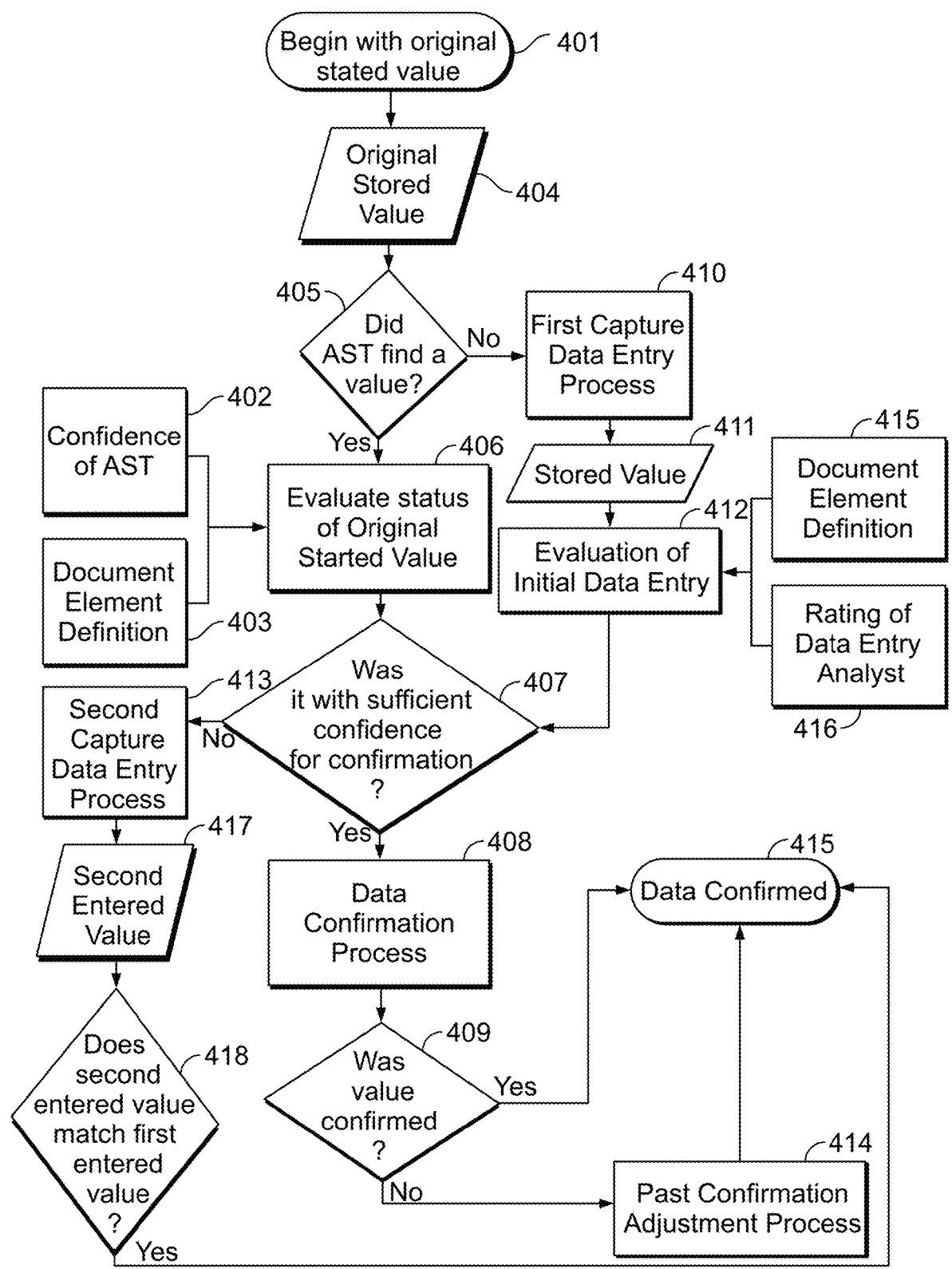
FIG. 5 is a flow diagram showing quality assurance steps implemented that assure the accuracy of the data captured from the income source documents.

FIG. 5 is a flow diagram showing quality assurance steps implemented that assure the accuracy of the data captured from the income source documents. The process in FIG. 5 is performed for each data element in produced by the system 10 in generating an income calculation. An example of a data element is a particular line from a particular tax form, i.e., line 7 of the 1040 from 2016. The system 10 may use hundreds of such line items for every income calculation.

The AST tool begins the process with the original stored value derived from the document (401). The AST tool attempts to extract data for every data element, and stores its result in an original stored value data store (404). If the AST does find a value, then the system evaluates the status of the original stored value (406). This is performed in order to determine whether additional blind data entry (a second blind attempt) or confirmation is required. The evaluation (406) is based on two factors: the confidence of the AST in generating the value (402), and two facts contained in the configuration the data element (403). These two facts are the general importance of the field for consistency calculations, and the general history of success in obtaining accurate data from the AST. Many fields on tax returns are part of networks of calculations. A simple example might be cases where line one plus line two equals line three. If all three lines are captured, then their accuracy can be evaluated by checking the value of each field, as is done by form level consistency checks identified in step 305 in FIG. 4. If the fields have relatively few crosschecks, there is more importance in individual effort to assure the accuracy of the particular field. This factor is reflected in the configuration of the data element (403). The evaluation thus identifies the requirements of the particular data field. The tool then determines whether the status of the original stored value provide sufficient confidence for confirmation (407). If the data field requires confirmation, then data confirmation is performed (408). The data confirmation includes presenting the data for the data field on an interface for viewing by a data control analyst. The data capture analyst is presented with an opportunity to confirm or disagree with the data via the generated interface (409). If the data capture analyst agrees with the data value, then the data is confirmed (419) and the process is complete for the data element. If the data capture analyst disagrees, then the post confirmation adjustment process (414) is triggered. In the post confirmation adjustment process, the user interface highlights that there is a difference that requires adjudication. The data capture analyst then adjudicates the difference to confirm the data. Once finished, the data is confirmed (419).

If the decision made is that there is insufficient confirmation (407), further blind entry is required. The process continues to initiate a second capture data entry process (413). The process generates an interface that allows a data capture analyst to enter a value without knowledge of the value generated by the AST. The confirmation process follows a similar path as if two data capture analysts provide confirmation. Thus, the second entered value is received (417). The process determines whether the second entered value matches the first entered value (418). If the values match, the data is confirmed (419). If the values do not match, the process proceeds to the post confirmation adjustment process performed by the second data capture analyst (414).

If the AST does not find a value (405), the process proceeds to generate an interface to prompt a data capture analyst to enter an initial value based on the displayed document (410). The data capture analyst manually enters an initial value to the interface that is stored (411). A second data capture analyst will be prompted to look at the data via an evaluation interface (412). The evaluation (412) is made based on two factors: the rating of the data capture analyst (416) and information contained in the configuration of the data element (415). This is similar to the logic described above with respect to step 403. The important factor is the interconnectedness of the data. Based on the evaluation, the system 10 will decide whether there is sufficient confidence (407) to confirm the data (408), or perform a second blind data entry (413).

The second blind data entry (413) is if the AST finds a value but the evaluation (406) deems a second blind entry as necessary, or if the AST does not find a value, a data capture analyst enters the original value (410), and the evaluation deems a second blind entry as necessary (412).

The basic function of the system 10 is to receive income source documents and generate a reasonably justified monthly income calculation. The splitting and data capture processes in FIGS. 3-4 assure that the income source documents are accurately transcribed from documents and images to usable stored data. FIGS. 6A-6B are a screen shot of an interface 650 used to confirm data capture during the quality assurance step in FIG. 5 in reviewing data determined from the processes in FIGS. 3-4. The interface 650 includes a document window 660 that shows the source document, which in this example is a schedule K-1. An input field 670 includes a listing of different data that is derived from the source document by the automated scanning tools. In this example, each of the lines from the image of the document have corresponding lines with a description, an amount and a status icon. The status icons may include a lock icon that signifies the data value is correct, a stamp icon that when selected signifies confirmation, or a pencil icon, that when selected allows the operator to change the data value. In this example, year and ordinary business fields 672 and 674 are correctly populated by the automated scanning tool and therefore have the lock icon. A field with a lock icon cannot be edited, but a qualified operator can unlock the field by pressing the lock icon. In the absence of a value, such as a company name field 676, the operator may enter the missing data. In certain data fields, the logic of the system requires a "double blind" data entry, so such data fields are left blank for entry by the operator. In fields that display the pencil and stamp icon, there has been one step of data capture, but the value requires confirmation. For example, an EIN field 678 includes the stamp icon and the pencil icon, allowing an operator to either confirm the value by selecting the stamp icon, or enter a new value by selecting the pencil icon.

Figure 7:
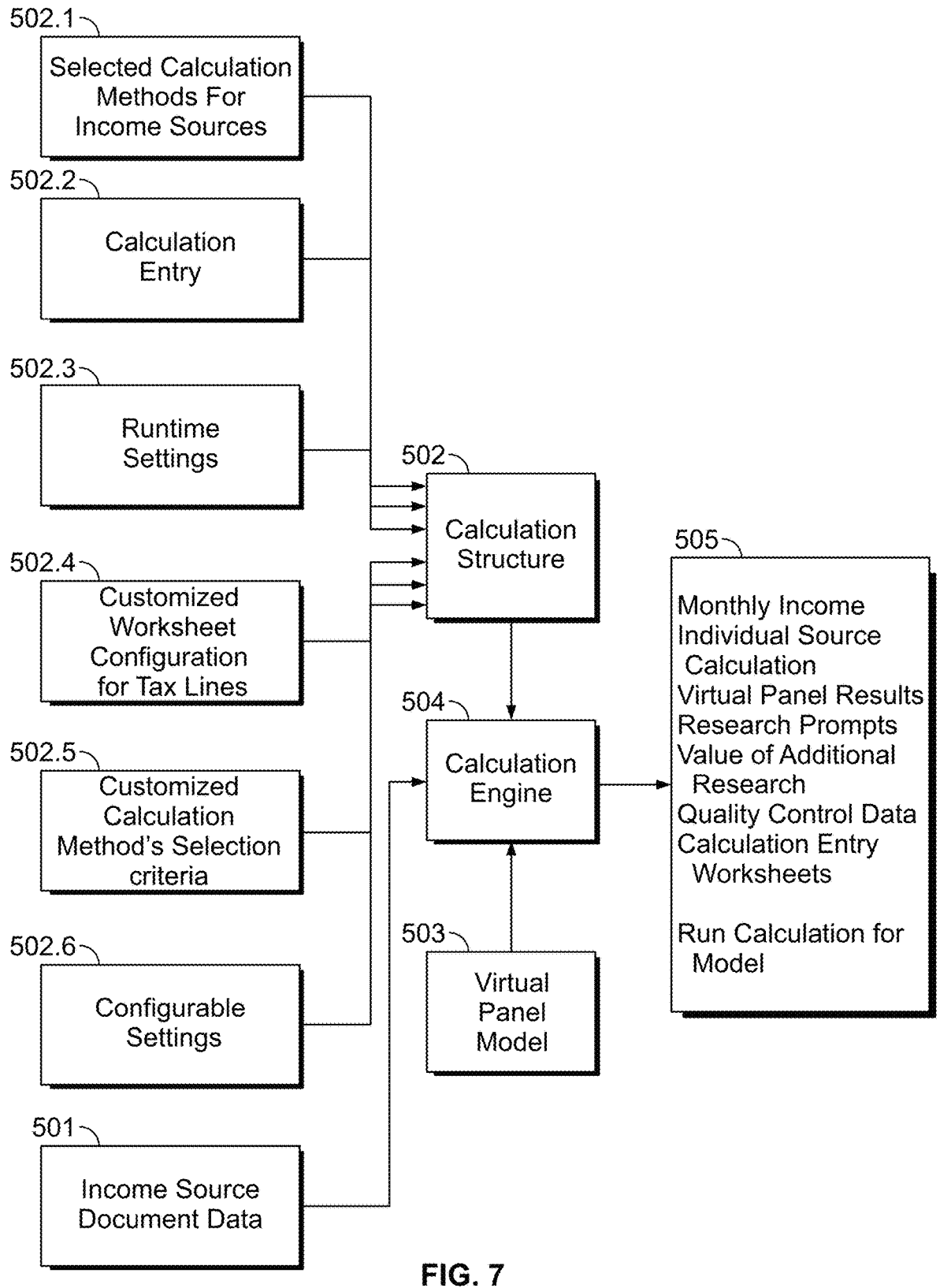
FIG. 7 is a flow diagram showing the process of calculating the income result from the source data.

FIG. 7 is a flow diagram showing the process of calculating the income result from the source data. The process of calculating the income includes receiving the income source document data (501). A calculation structure 502 and a virtual panel model 503 are applied by a calculation engine 505 to yield a calculation result.

A variety of income related data may be used by the calculation engine 505. For example, there may be data reflecting income sources that include for example, Disability by Award Letter, Disability by 1099, Trust, Employment by VOE, Commission Employment, Pension from 1099, Pension from Award Letter, Homeowner Subsidy, Taxable Interest, Tax Exempt Interest, Government Assistance Program, VA Benefits, Unemployment, Note Receivable, Child Support, IRA, 401k, Alimony, Annuity, Sole Proprietorship, Partnership, S Corporation, C Corporation, Dividends—Taxable & Tax Exempt, Social Security, Employment—W2 Average, Employment—W2 & Paystub, Employment—Offer Letter, Military, Mortgage Credit Certificate, Rental Income by Lease Agreement, and Rental Income by Tax Returns. The data and calculations may be made from different source documents that may be part of received document package. Example source documents may include 1099 form, Auto Allowance Letter, Award Letter, Balance Sheet, Business Credit Report, Business Ownership Proof, Cancelled Check, Court Order, Court Record, Debt Total, 4506T form, Deposit Slip, Divorce Decree, Govt. Asst. Documentation, Housing Allowance Letter, Lease Agreement, Military Verification, Mortgage Credit Certification, Note, Offer Letter, Paycheck Stub, Pension Award Letter, Profit and Loss, Retirement Statement, Separation Agreement, Supplemental Verification, Tax Extension, Tax Return, Tax Transcript, Trust Agreement, VA Documentation, VOE, W2, and Custom Documents.

The example calculation structure 502 consists of a variety of elements. The first element is a selection of calculation methods 502.1, which are identified for particular income sources. A variety of calculation methods may be available for each income source. For example, there may be ten different calculation methods in the library for the purpose of calculating rental income. A calculation method consists of an identification of required source documents and a method for using the data in these source documents to create a calculation method. Calculation methods identify a sequence of calculations, and provide a method for demonstrating the calculations in a printout or image document. The logic in a calculation method can often be simulated by using a particular spreadsheet as a guide, or a description in logical steps. In one embodiment, each calculation method is a Visual Basic file which contains the code to implement the logic of the method.

The second element of the calculation structure 502 is a designated calculation entity 502.2. This identifies the "audience" or "consumer" or "investor" that specifies the types of calculations and assumptions that ought to be used. Examples of potential calculation methods are Fannie Mae and Freddie Mac, who each offer income guidelines that identify how income is to be calculated by each source. Another example is Appendix Q of the Dodd-Frank regulations which identify calculation methods to be used for qualified mortgages. There is no limitation on the number of type of calculation entities.

The third element of the calculation structure 502 is runtime settings 502.3. The runtime settings 502.3 may be selected by a particular user when running a report on the calculated income. The system 10 allows a user to easily re-run a calculation using different settings from the runtime settings 502.3. Examples of settings which might be varied at runtime include the calculation entity, the number of years of data the calculation uses, whether the calculation is for a particular individual or group of individuals, and others.

The fourth element of the calculation structure 502 is customized worksheet configurations for tax line calculations 502.4. These are configurations that identify how particular line items from returns are to be used in calculations. These configurations may be customized for individual users or companies. A variety of options are allowed for each tax line, including what sorts of operations are to be used (add, subtract, multiply), conditional use of elements, whether they ought to trigger research prompts, and how they are to be displayed in calculation documentation. This element creates a highly configurable environment for calculations, without the use of coding. An example of the worksheet configurations are XML data structures are shown in FIG. 8.

The fifth element of the calculation structure 502 is configuration data 502.5 which identifies default calculation methods for particular income sources, with potential limitation or restriction of calculation methods in the library. The configuration data is customizable set of specifications for which calculation methods are allowed for the lender/user group and which are set to be defaults. For example, certain types of rental calculation methods are eligible for Fannie Mae, and other types are eligible for Freddie Mac. One type of calculation might require mortgage statements for calculation and others may not. These configurations can be made sensitive to the calculation method as well as the user group. For example, a particular user group (a lender perhaps) may decide that it does not want to calculate income using only W2 documents. In that case, this configuration data would be set to disallow that particular method of calculation. FIG. 9 is an example XML data structure for the selection of configuration data for the process of calculating an income result.

A sixth element of the calculation structure 502 is configurable settings that impact the calculation results 502.6. These are a variety of settings that impact calculations. One example of settings that impact calculations may be provided to user in a settings screen that may be generated on the analyst workstation 70. FIGS. 10A-10D are screen shots of setting interfaces that allow selection of configuration data for the process of calculating an income result. As shown in FIGS. 10A-10D, the setting interfaces all have tabs that allow the selection of the different setting screens shown in FIGS. 10A-10D and FIG. 11. These include report settings, configuration settings, virtual panel settings, trend analysis settings, and cutover settings.

Figure 10A:
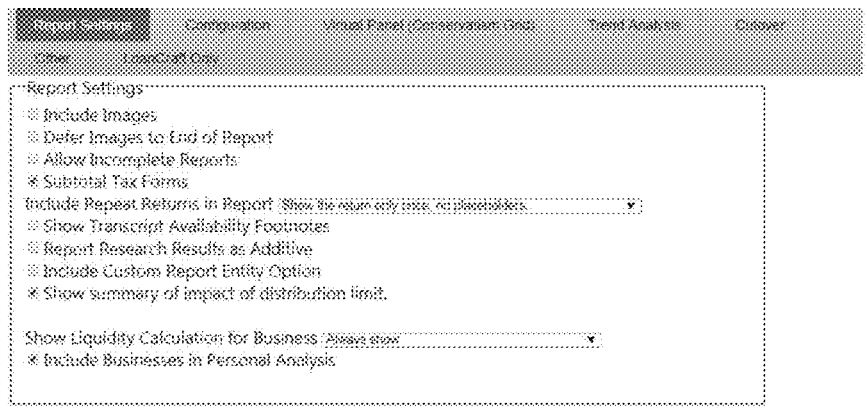
Figure 10B:
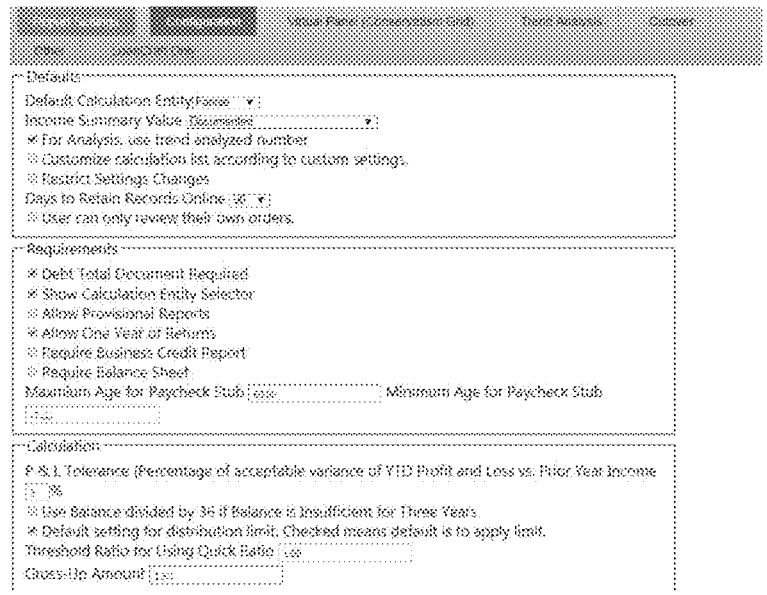
Figure 10C:

FIG. 10A shows a report setting interface that allows a user to enter aspects of the created report. FIG. 10B shows a configuration settings interface that allows a user to identify whether balance sheet and business credit report ought to be required; whether the report will require one or two years of returns; whether the standard calculation entity that should be used; and whether to use trend analysis on the personal return analysis. FIG. 10C shows a trend analysis settings interface that allows a user to identify methods for trend analysis, using a variety of means to consider variations in income from year to year. These settings tie in with the methods for trend analysis used by the virtual panel models as will be explained below. FIG. 10D shows a settings interface for cutover dates that allows an operator to set the requirements for use of aged returns.

The virtual panel model 503 provides an efficient mechanism for identifying when judgment of an analyst is likely to make a significant difference in the income calculation. While the system 10 provides a single calculation for monthly income, it also provides a basis and groundwork for further judgment by an analyst such as an underwriter. In some cases, such as for a self-employed borrower with any complexity in their income, different underwriters will often come up with different answers as to income. Different lenders adopt policies that lead to different results. This even occurs when they are selling to the same investor, even Fannie Mae or Freddie Mac. The system 10 allows requestors to configure policy settings on a range of underwriting assumptions and principles. These can be set for three different levels, or models in this example. Of course other levels or models may be used.

The various settings within a model provide differing kinds of assumptions. These assumptions are meant to capture varying levels of conservatism. While the variety of settings may be set in any way, an analyst will generally set one model to closely adhere to their basic credit policy, or their view of how assumptions should be treated. For example, certain analysts will set one model in a "conservative" fashion, making decisions in a manner that is skeptical about the level of an individual's income. Certain analysts will set a model in an "optimistic" fashion, in a way that will provide an optimistic view of the individual's income.

In this example, the virtual panel model settings of the virtual panel model 503 are presented in a settings screen that may be accessed via the tabs in the interfaces in FIGS. 10A-10D. FIG. 11 is a screen shot of a settings screen that allows selection of a model for a virtual panel. In the example in FIG. 11, along with other data, business owners report two key figures in a K-1 form. They provide the amount of income their share of the business provided, and they provide the amount of the money that was distributed to them. Sometimes this amount varies greatly. Different analysts and investors have different points of view about which is a better indicator of income. Actual distribution of income is a more conservative number to use, since it is less susceptible to accounting transactions which might not reflect actual income. But owners often keep cash in their business for various reasons, and using distribution instead of income might be thought to underestimate income. Some investor guidelines specify that the liquidity of the business ought to be evaluated, and if it is at a certain level, then income ought to be used rather than distributions, since there is sufficient cash that could have been distributed, had the owner desired.

The considerations identified here can be easily modeled with the Virtual Panel settings shown in FIG. 11. One model can lead the calculation to be more likely to use distributions, perhaps by setting a higher threshold for liquidity. Another model might make the calculation more likely to use income, perhaps by setting a lower threshold for liquidity. The upshot is that via these models, the framework can credibly simulate the viewpoint of conservative or optimistic analysts.

In the example shown in FIG. 11, the setting "Minimum Liquidity Ratio" has a setting for 4.00 for the conservative model and 1.50 for the moderate model, and 1.0 for the optimistic model. The customer's liquidity is calculated by using several data elements from their business returns. If, for example, a customer's liquidity is 200%, the conservative model will limit its calculation of earnings to the amount of distributions from the business, since the 200% liquidity is less than the 4.0 minimum. But the optimistic model will use the income amount, even if it is greater than the distributions, since the 200 liquidity value exceeds the minimum of 1.0. Another area of difference between conservative and optimistic models involves trend analysis. It is often a component of credit policy that two years of income data be reviewed. There is significant variance in how the difference between two years of income ought to be considered. The standard averaging setting is one option, which can be configured as is seen in FIG. 10B. "Aggressive Discounting" can be configured as well. For example, in the case of a business having $120,000 of income in 2016, and $90,000 of income in 2017, a moderate view of the business might project that the business will make $90,000 in 2018. A conservative view of the business might be worried that it is in a downward spiral, and not even want to count $90,000 as income. An optimistic view might indicate expectation that the business will return to $120,000. It should also be noted that these settings can be used as alert generators. Users can set aggressive discounting settings for the conservative model, so that further analysis will be triggered.

Figure 12:
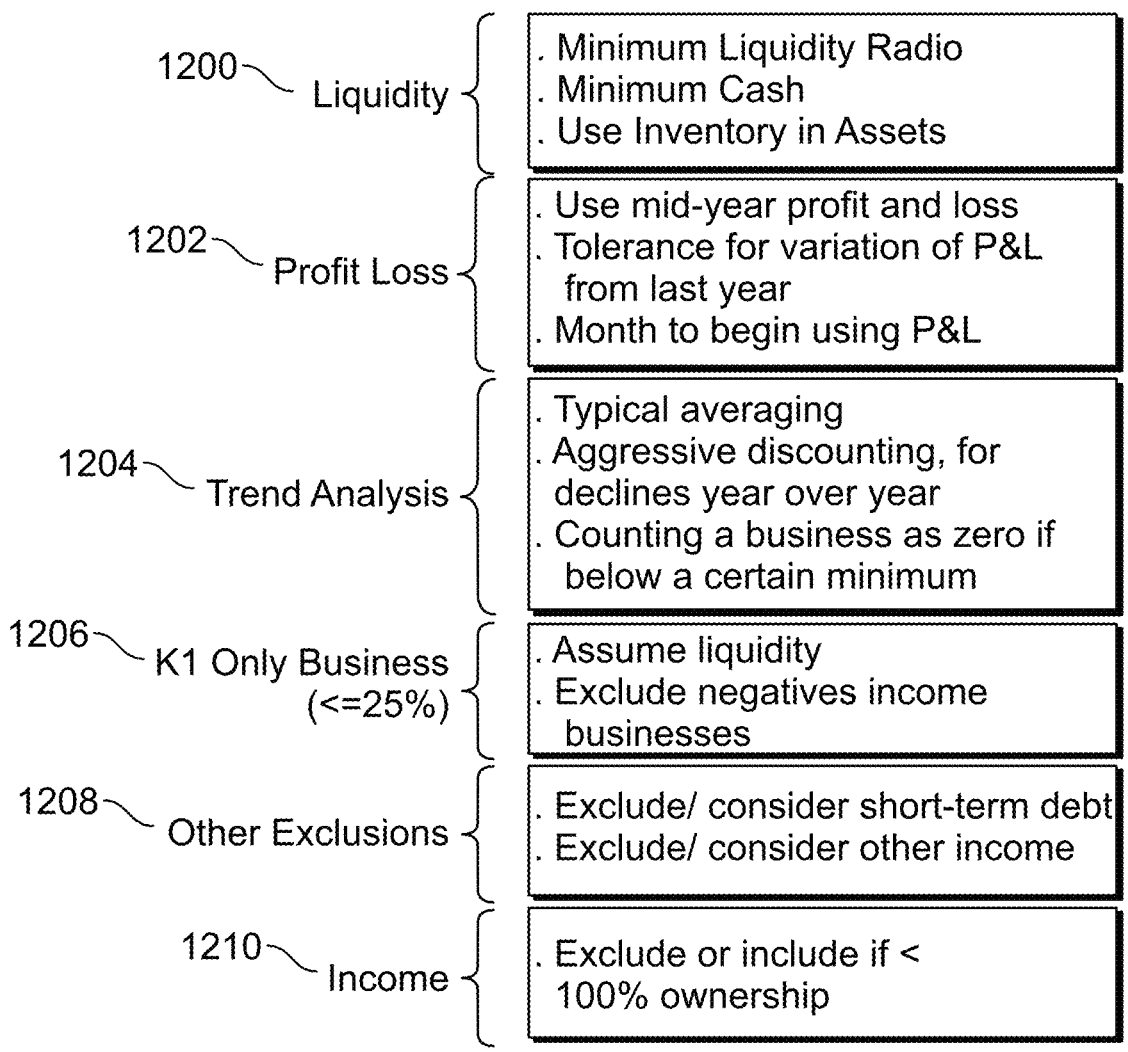
FIG. 12 is a table that identifies a partial list of elements which can be varied for each model in the settings shown in FIG. 10A-10D.

FIG. 12 is a table that identifies a partial list of elements which can be varied for each model in the settings shown in FIGS. 10A-10D. The table in FIG. 12 shows a liquidity element 1200, a profit/loss element 1202, a trend analysis 1204, a K1 only business element 1206, an other exclusions element 1208, and an 1120 income element 1210.

Figure 13:
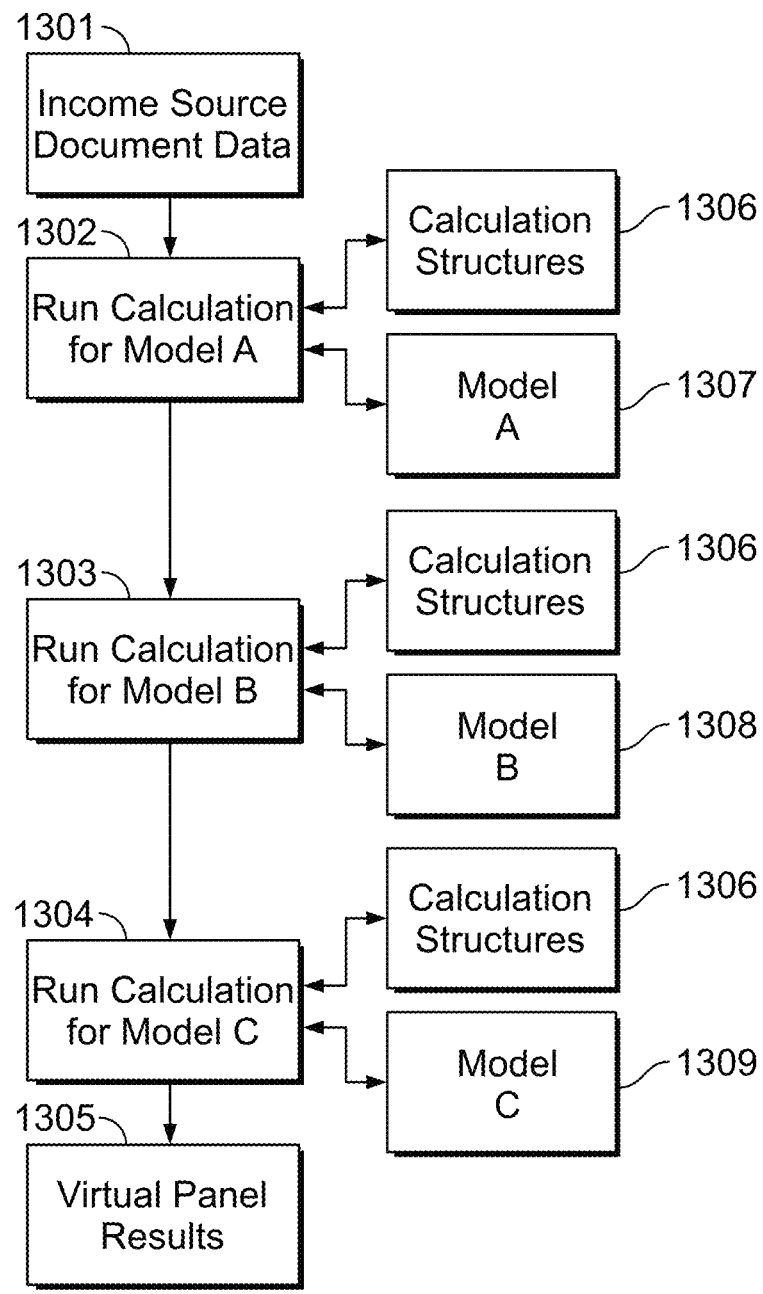
FIG. 13 is a flow diagram of how the model-based calculation alternatives (virtual panel) are calculated from the source data.

FIG. 13 is a flow diagram of the process for generating these virtual panel calculations. The income source document data is obtained from the previously described processes (1301). The process runs calculations for a first model A (1302). The calculations are run using a specific set of calculation structures from a set of calculation structures 1306 and a first model 1307. The process also runs calculations for a second model B (1303), using a specific set of calculation structures from the calculation structures 1306 and a second model 1308. The process runs calculations for a third model C (1304) using calculation structures from the calculation structures 1306 and a third model 1309. Essentially, each calculation is performed three times, first with Model A 1307, then with Model B 1308, and finally with Model C 1309. The process than outputs results (1305).

An example of a resulting report from a virtual panel is shown in the output report shown in FIG. 14A. In this case, the "Conservative" monthly income estimate is $25,895.72. This is the value using conservative assumptions. The "Moderate" estimate is $33,406.96. The "Optimistic" estimate is $34,824.68. The message indicates that there is a 15% difference between Conservative and Optimistic views, and thus that the report should be reviewed. This range is configurable by users. In this example, given that there is a 15% difference between estimates, there were material issues that caused the models to provide different answers (such as the liquidity example above). An analyst may use the report to identify where these differences are and determine which model they agree with. The results may also be provided in a data format. This provides valuable information in and of itself, but also provides an opportunity for a streamlined workflow.

Returning to FIG. 7, the Income Result 505 has the following elements. (1) A calculation of monthly income, using the selected model, calculation entity, and other runtime settings. (2) Calculation of income for each income source, using an identified calculation method for each source, and detail associated with the calculation. (3) Virtual Panel results. (4) Research prompts, which identify potential sources of income, whether they are being used in the particular calculation, and if not, what additional information is required to use them. (5) A projection of potential income which might be documented with the acquisition of additional source documents. (6) Quality Control data, which can be used to verify and evaluate the completeness of the report. (7) Calculation Entity worksheets, which emulate overall calculation structures for personal and business income.

The virtual panel data can be integrated into workflow management structures to provide efficient use of costly and scarce resources. First, when the most conservative models provide income that exceeds the minimum requirements of the user, then the user may choose to spend less review time in evaluating the income file. Second, when there is close agreement about the income outcome between the various models, this is an indicator that additional review time would not yield a substantially different outcome. The virtual panel is in effect a "complexity indicator," and close matches between the models indicates that there aren't material issues that require human judgment.

In the case of other elements within the system 10, the automated and operator based elements are integrated within the process itself. In this case, the automated model calculations are delivered by the system while the system also provides interfaces for guiding the input from operator judgment, in situations where such judgement is likely to yield value.

Figure 15:
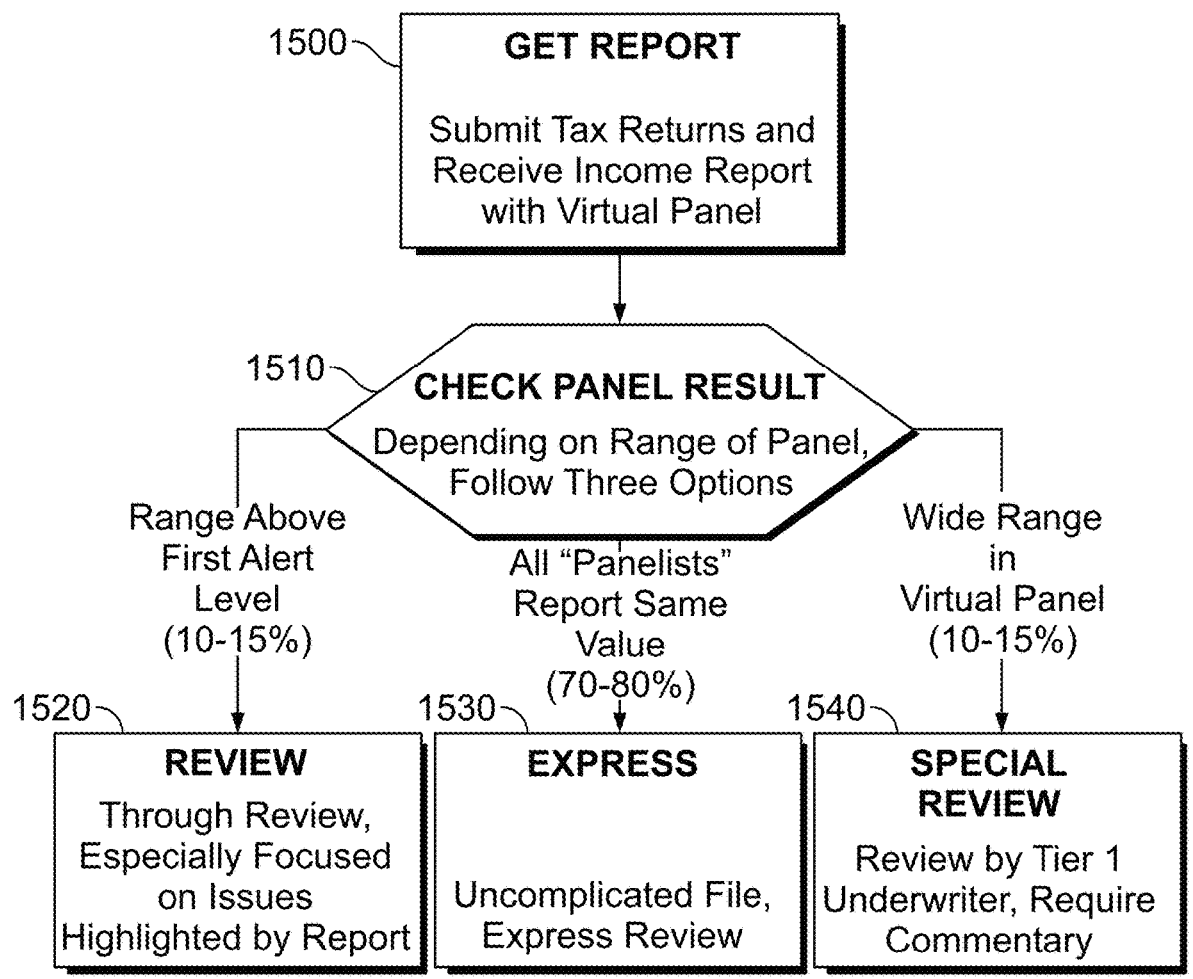
FIG. 15 is a screen shot of the data capture and confirmation interface in one of the embodiments.

FIG. 15 is an example workflow diagram that that can be used as a result of the virtual panel output to classify the result of the panel. The user may initially submit the data derived from the document source to obtain a virtual panel report (1500). The panel result is checked based on the range of the panel (1510). Given the high cost and scarcity of underwriter or analyst time, it is useful to focus their effort on situations in which their judgment is likely to make a material difference. The principle implemented by the system 10 is to allow a comparison between potentially widely different models to the same set of data. If the widely different models yield very similar answers, the user group can infer that there is not likely to be any useful impact from human analysis. This might be true even with files that have a very large number of businesses. For example, if a conservative model indicates that the income level is $10,500 per month, and the optimistic model indicates the same, then there is a zero percent difference. This is highly valuable as it implies that the analyst/underwriter will not arrive at a different result. The system 10 can safely refer this file to an express review process.

Three options may be available to the operator as a result of the virtual panel. For income calculations above a first alert level, a review (1520) may be conducted. If the panelists from the virtual panel report the same value, an express review process (1530) may be conducted. If there is a wide range of divergence from the virtual panel, a special review process (1540) is initiated. If there is significant variation in the outcome of the model, there are several considerations that an analyst/underwriter may wish to consider. For example, an analyst may consider whether the estimate of the conservative model is above the needed income. If this is the case, the conservative view may be used. An analyst may also consider whether the estimate of the optimistic model is below the needed income. If this is the case, the file is likely to be declined without much further review.

More specifically, the underwriter/analyst can use the report to determine decisions that were made by the model, and determine which decisions match the judgment of the underwriter/analyst. The underwriter analyst might consider the nature of the business, time of year, other considerations about the file, industry of the business, or other factors when determining whether it has sufficient liquidity to pay more distributions. For example, an analyst may need guidance on how to treat declining earnings in a business as explained above. In such a case, a client may have a single business where income is down 25%. The report produced by the system 10 will indicate the impact of assuming that this business is not going to contribute, and the alert range will indicate whether this is material. If the assumption is material, then the analyst/underwriter may request additional information relating to the 25% decline in business. The analyst may make a considered judgment that the decline is temporary, or the causes have been mitigated. This is a time consuming process, but relevant to the final determination, and therefore justified. However, the applicant may have ten businesses, and only one has declining income, and thus the alert is not triggered. Under this workflow, time will not be wasted on this file.

Further example reports are shown in FIGS. 14B-14_. FIG. 14B is an example report that shows the total documented income for the file. The italicized section in FIG. 14B reconciles the documented sources with the return analysis (1084/Form 91), and also reconciles the tax data from schedule E and the attached business schedules. The section below the qualified monthly income reconciles the 1040 with the various required schedules. This is used for quality assurance, and to confirm that all schedules are present.

FIG. 14C is an example report that lists each documented income source, showing the documents that were used and the calculation methods in the process above. The system 10 has a wide variety of calculation methods that can be turned on or off, to correspond to a credit policy.

FIG. 14D is an example report of the calculations for pension income.

For businesses, there may be three reports. First, there is a summary which combines the various calculations and summarizes the outcome. FIG. 14E shows an example summary report combining various calculations and summarizing income The second report includes supplemental calculations such as detailed trend analysis and liquidity analysis. FIG. 14F shows an example report that shows supplemental calculations. The final report summarizes subtractions and addbacks from the returns. FIG. 14G shows an example report showing subtractions and addbacks. These will sometimes vary depending on the calculation entity.

FIG. 14H is an example report for trend analysis, calculation models and liquidity that may be generated to assist an analyst. FIG. 14I is an example report for liquidity analysis and decision making that may be generated to assist an analyst. FIG. 14J is an example report showing return analysis. The example return analysis report shows the analysis of all the income elements using standardized worksheet forms. The example report in FIG. 14J can also be customized to other formats. Footnotes help reconcile the documented sources and the worksheet items.

FIG. 14K is an example report for research prompts. The report for research prompts provides detailed information about the research and documentation necessary for each of the income components. The report pulls information from guidelines, shows the trend for the income source, and its current level of documentation.

FIG. 14L is an example report for required documents for additional sources. This report is a checklist of further documents necessary to document income. The operator may use this report to request additional information from the customer. This report is generated from the calculation assigned to the various possible sources identified from the return data.

FIG. 14M is an example report for the impact of distribution limit. For individual businesses that have K1s, the report calculations of the example report in FIG. 14M will assist in making decisions based on settings and liquidity about whether to use a full income number, or use the amount distributed. This report indicates whether this has an impact on the outcome, and how much that impact is. This allows an underwriter to note whether further analysis is necessary to confirm the calculations.

FIG. 14N is an example report for the potential for further documentation. The report in FIG. 14N is a projection of the impact of further research, and the possible upside for the file. The first line in FIG. 14N shows income already documented. The second line shows the amount that is projected for the items that are considered "standard" additional research, such as W2, IRA statements or other documents that are relatively easy to obtain. The third line shows the amount projected for all items, which includes items that are typically harder to obtain.

The flow diagram in FIGS. 3-6 and 13 are representative of example machine readable instructions for the processors in the devices and modules in FIG. 1. In this example, the machine readable instructions comprise an algorithm for execution by: (a) a processor; (b) a controller; and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIGS. 3-6 and 13, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Figure 16:
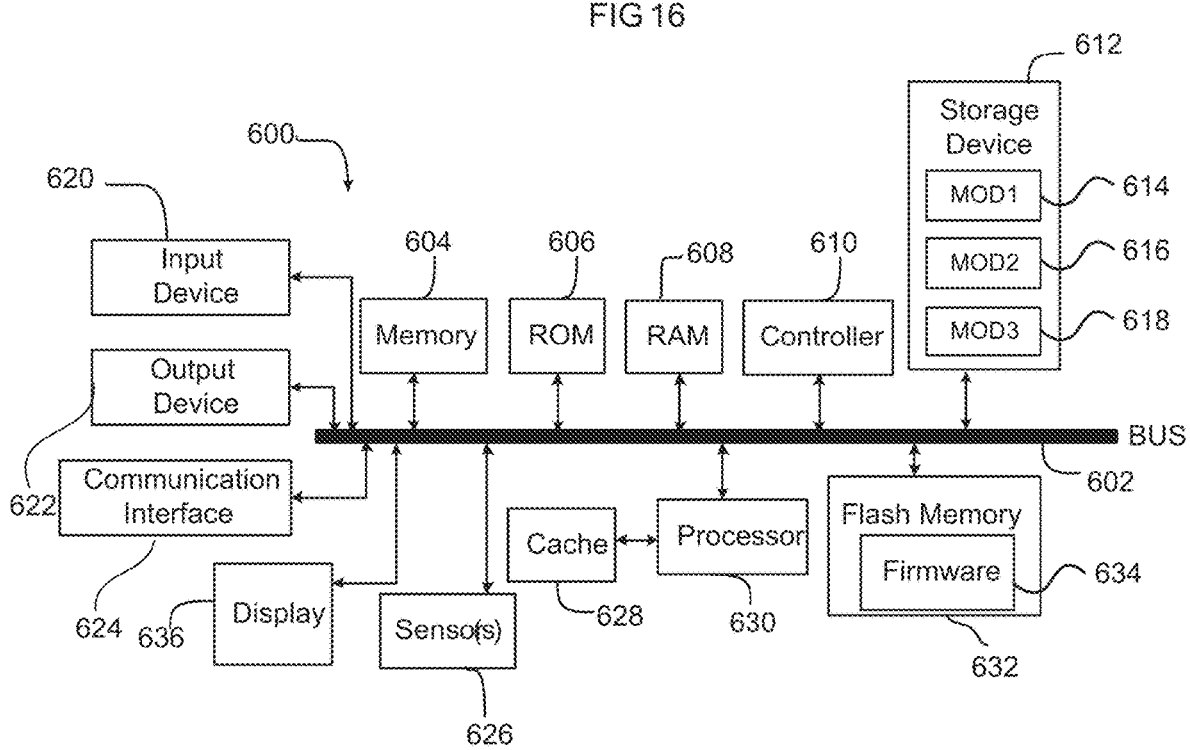
FIGS. 16 and 17 illustrate exemplary systems in accordance with various examples of the present disclosure.

FIG. 16 illustrates an example computing system 600, in which the components of the computing system are in electrical communication with each other using a bus 602. The system 600 includes a processing unit (CPU or processor) 630, and a system bus 602 that couples various system components, including the system memory 604 (e.g., read only memory (ROM) 606 and random access memory (RAM) 608), to the processor 630. The system 600 can include a cache of high-speed memory connected directly with, in close proximity to, or integrated as part of the processor 630. The system 600 can copy data from the memory 604 and/or the storage device 612 to the cache 628 for quick access by the processor 630. In this way, the cache can provide a performance boost for processor 630 while waiting for data. These and other modules can control or be configured to control the processor 630 to perform various actions. Other system memory 604 may be available for use as well. The memory 604 can include multiple different types of memory with different performance characteristics. The processor 630 can include any general purpose processor and a hardware module or software module, such as module 1 614, module 2 616, and module 3 618 embedded in storage device 612. The hardware module or software module is configured to control the processor 630, as well as a special-purpose processor where software instructions are incorporated into the actual processor design. The processor 630 may essentially be a completely self-contained computing system, containing multiple cores or processors, a bus, memory controller, cache, etc. A multi-core processor may be symmetric or asymmetric.

To enable user interaction with the computing device 600, an input device 620 is provided as an input mechanism. The input device 620 can comprise a microphone for speech, a touch-sensitive screen for gesture or graphical input, keyboard, mouse, motion input, and so forth. In some instances, multimodal systems can enable a user to provide multiple types of input to communicate with the system 600. In this example, an output device 622 is also provided. The communications interface 624 can govern and manage the user input and system output.

Storage device 612 can be a non-volatile memory to store data that are accessible by a computer. The storage device 612 can be magnetic cassettes, flash memory cards, solid state memory devices, digital versatile disks, cartridges, random access memories (RAMs) 608, read only memory (ROM) 606, and hybrids thereof.

The controller 610 can be a specialized microcontroller or processor on the system 600, such as a BMC (baseboard management controller). In some cases, the controller 610 can be part of an Intelligent Platform Management Interface (IPMI). Moreover, in some cases, the controller 610 can be embedded on a motherboard or main circuit board of the system 600. The controller 610 can manage the interface between system management software and platform hardware. The controller 610 can also communicate with various system devices and components (internal and/or external), such as controllers or peripheral components, as further described below.

The controller 610 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 610 to initiate or conduct specific hardware recovery procedures or operations, as further described below.

The controller 610 can also include a system event log controller and/or storage for managing and maintaining events, alerts, and notifications received by the controller 610. For example, the controller 610 or a system event log controller can receive alerts or notifications from one or more devices and components, and maintain the alerts or notifications in a system event log storage component.

Flash memory 632 can be an electronic non-volatile computer storage medium or chip that can be used by the system 600 for storage and/or data transfer. The flash memory 632 can be electrically erased and/or reprogrammed. Flash memory 632 can include EPROM (erasable programmable read-only memory), EEPROM (electrically erasable programmable read-only memory), ROM, NVRAM, or CMOS (complementary metal-oxide semiconductor), for example. The flash memory 632 can store the firmware 634 executed by the system 600 when the system 600 is first powered on, along with a set of configurations specified for the firmware 634. The flash memory 632 can also store configurations used by the firmware 634.

The firmware 634 can include a Basic Input/Output System or equivalents, such as an EFI (Extensible Firmware Interface) or UEFI (Unified Extensible Firmware Interface). The firmware 634 can be loaded and executed as a sequence program each time the system 600 is started. The firmware 634 can recognize, initialize, and test hardware present in the system 600 based on the set of configurations. The firmware 634 can perform a self-test, such as a POST (Power-on-Self-Test), on the system 600. This self-test can test the functionality of various hardware components such as hard disk drives, optical reading devices, cooling devices, memory modules, expansion cards, and the like. The firmware 634 can address and allocate an area in the memory 604, ROM 606, RAM 608, and/or storage device 612, to store an operating system (OS). The firmware 634 can load a boot loader and/or OS, and give control of the system 600 to the OS.

The firmware 634 of the system 600 can include a firmware configuration that defines how the firmware 634 controls various hardware components in the system 600. The firmware configuration can determine the order in which the various hardware components in the system 600 are started. The firmware 634 can provide an interface, such as an UEFI, that allows a variety of different parameters to be set, which can be different from parameters in a firmware default configuration. For example, a user (e.g., an administrator) can use the firmware 634 to specify clock and bus speeds; define what peripherals are attached to the system 600; set monitoring of health (e.g., fan speeds and CPU temperature limits); and/or provide a variety of other parameters that affect overall performance and power usage of the system 600. While firmware 634 is illustrated as being stored in the flash memory 632, one of ordinary skill in the art will readily recognize that the firmware 634 can be stored in other memory components, such as memory 604 or ROM 606.

System 600 can include one or more sensors 626. The one or more sensors 626 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 626 can communicate with the processor, cache 628, flash memory 632, communications interface 624, memory 604, ROM 606, RAM 608, controller 610, and storage device 612, via the bus 602, for example. The one or more sensors 626 can also communicate with other components in the system via one or more different means, such as inter-integrated circuit (I2C), general purpose output (GPO), and the like. Different types of sensors (e.g., sensors 626) on the system 600 can also report to the controller 610 on parameters, such as cooling fan speeds, power status, operating system (OS) status, hardware status, and so forth. A display 636 may be used by the system 600 to provide graphics related to the applications that are executed by the controller 610, or the processor 630.

Figure 17:
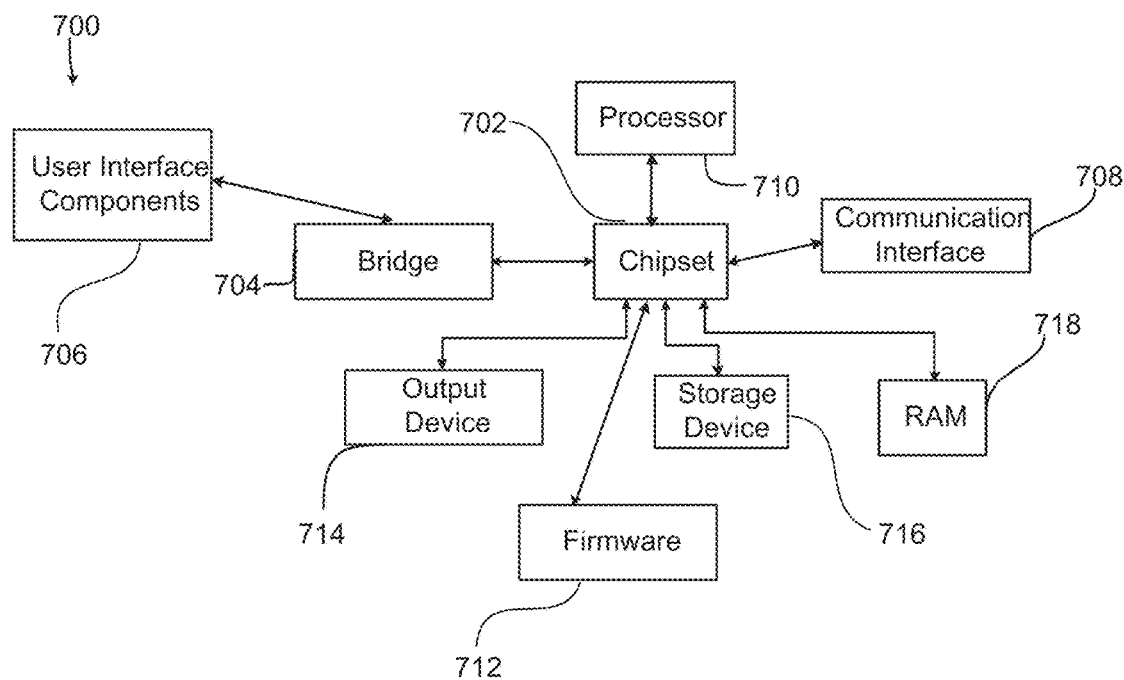

FIG. 17 illustrates an example computer system 700 having a chipset architecture that can be used in executing the described method(s) or operations, and generating and displaying a graphical user interface (GUI). Computer system 700 can include computer hardware, software, and firmware that can be used to implement the disclosed technology. System 700 can include a processor 710, representative of a variety of physically and/or logically distinct resources capable of executing software, firmware, and hardware configured to perform identified computations. Processor 710 can communicate with a chipset 702 that can control input to and output from processor 710. In this example, chipset 702 outputs information to output device 714, such as a display, and can read and write information to storage device 716. The storage device 716 can include magnetic media, and solid state media, for example. Chipset 702 can also read data from and write data to RAM 718. A bridge 704 for interfacing with a variety of user interface components 806, can be provided for interfacing with chipset 702. User interface components 706 can include a keyboard, a microphone, touch detection and processing circuitry, and a pointing device, such as a mouse.

Chipset 702 can also interface with one or more communication interfaces 708 that can have different physical interfaces. Such communication interfaces can include interfaces for wired and wireless local area networks, for broadband wireless networks, and for personal area networks. Further, the machine can receive inputs from a user via user interface components 706, and execute appropriate functions, such as browsing functions by interpreting these inputs using processor 710.

Moreover, chipset 702 can also communicate with firmware 712, which can be executed by the computer system 700 when powering on. The firmware 712 can recognize, initialize, and test hardware present in the computer system 700 based on a set of firmware configurations. The firmware 712 can perform a self-test, such as a POST, on the system 700. The self-test can test the functionality of the various hardware components 702-718. The firmware 712 can address and allocate an area in the RAM memory 718 to store an OS. The firmware 712 can load a boot loader and/or OS, and give control of the system 700 to the OS. In some cases, the firmware 712 can communicate with the hardware components 702-710 and 714-718. Here, the firmware 712 can communicate with the hardware components 702-710 and 714-718 through the chipset 702, and/or through one or more other components. In some cases, the firmware 712 can communicate directly with the hardware components 702-710 and 714-718.

It can be appreciated that example systems 600 and 700 can have more than one processor (e.g., 630, 710), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method of determining an income calculation report, the method comprising:
   providing a digital image of a document package of income related documents via a document server, each of the income related documents associated with an individual;
   separating the documents in the document package based on the digital image of the document pages via a splitting module;
   classifying the separated documents via a classification module executed by a processor;
   selecting an automated scanning tool based on the document classification on at least one of the separated documents via the classification module;
   determining an income related data value from a data field of the digital image of the at least one separated document via the selected automated scanning tool executed on an optical recognition server;
   determining a type of income related data related to the data field via the optical recognition server;
   determining an importance score of the income related data value from the data field based on the type of income related data related to the data field via the processor;
   determining a confidence score of the determined income related data value based on the historic yield and accuracy of the selected automated scanning tool and the importance score of the income related data related to the data field via the processor;
   confirming the determined income related data value if the confidence score exceeds a predetermined threshold value via the processor;
   providing an interface on an electronic display of an analyst station with the determined data value and a digital image of the at least one separated document for an analyst to enter a confirmation of the determined data value or an adjustment of the determined value if the confidence score is below the predetermined threshold value;

providing an interface on the electronic display of the analyst station for the input of configurations for a plurality of calculation models;

determining a plurality of income calculations of the individual based on at least the determined income related data value and the input configurations, each of the plurality of income calculations determined by a corresponding one of the plurality of calculation models via a calculation engine executed by a processor;

generating a report including the plurality of income calculations; and generating an interface displaying the report on the electronic display of the analyst station.

2. The method of claim 1, further comprising:

determining that a data value for the income related value is inadequate based on the confidence score;

providing an interface to display a document and an entry field on the analyst workstation; and receiving an input of a first entered data value for the income related data via the interface; and providing the first entered data value for the income related data.

3. The method of claim 2, further comprising:

providing a second interface to display the document and an entry field;

providing an interface to display a document and an entry field on a second workstation; and receiving an input of a second entered data value for the income related data via the interface; and providing the second entered data value for the income related data; and performing a double blind confirmation of the inadequate data value based on the first entered data value and the second entered data value.

4. The method of claim 1, further comprising:

determining that the income calculations determined from the plurality of models deviate from each other by a predetermined threshold; and setting an alert for further analysis of the income calculations.

5. The method of claim 1, wherein the plurality of models include a conservative model, a standard model, and an optimistic model, wherein the income calculation determined by the conservative model is less than the income calculation determined by the standard model, and wherein the income calculation determined by the standard model is less than the income calculation determined by the optimistic model.

6. The method of claim 1, wherein the income related data is one element of a set of income related data determined from the separated documents, and wherein the set of income related data is incorporated by the plurality of models.

7. The method of claim 1, wherein the configuration of the models are based on income source type, calculation entity type, and assessment policies.

8. The method of claim 1, further comprising:

determining the completeness of the separated documents from the document package of income related documents in relation to expected income related documents; and generating a prompt to identify a missing document based on the separated documents being incomplete.

9. A system for determining an analysis of income of an individual, the system comprising:

an electronic network;

a document server coupled to the network, the document server providing a digital image of a document package of income related documents;

a document storage device coupled to the network to store the digital image of the document package, each of the income related documents associated with an individual;

a splitting module executed on a splitting server coupled to the network, the splitting module separating the documents in the document package based on the digital image of the document pages;

a classification module executed on the splitting server that classifies the separated documents;

an optical recognition server including a plurality of automated scanning tools, the optical recognition server coupled to the network, the optical recognition server configured to:

select an automated scanning tool based on the document classification on at least one of the separated documents, wherein income related data from the at least one separated document is determined by the selected automated scanning tool and a type of income related data related to a data field of the at least one of the separated document, the type of income related data relating to the data field determined by the selected automated scanning tool; and determine an income related data value from the data field of the digital image of the at least one separated document;

an analyst workstation coupled to the network, the analyst workstation having a display generating an interface for the input of configurations for a plurality of calculation models; and a processor coupled to the network, the processor configured to:

determine an importance score of the income related data value from the data field based on the type of income related data related to the data field;

determine a confidence score of the determined income related data value based on the historic yield and accuracy of the selected automated scanning tool and the importance score of the income related data related to the data field;

confirm the determined income related data value if the confidence score exceeds a predetermined threshold value;

provide an interface on an electronic display of the analyst workstation with the determined data value and a digital image of the at least one separated document for an analyst to enter a confirmation of the determined data value or an adjustment of the determined value if the confidence score is below the predetermined threshold value;

determine a plurality of income calculations of the individual based on the determined income related data and the configurations, each of the plurality of income calculations determined by a corresponding one of the plurality of calculation models via a calculation engine executed by a processor;

generate a report including the plurality of income calculations; and generate an interface on the display of the analyst workstation displaying the report.

10. The system of claim 9, further comprising:

a second data capture analyst workstation coupled to the network, the second data capture analyst workstation including an interface for display of the at least one separated document and an entry field;

receiving an input of a second entered data value for the income related data via the interface, and providing the second entered data value for the income related data; and wherein the determination server performs a double blind confirmation of the inadequate data value based on the first entered data value and the second entered data value.

11. The system of claim 9, wherein the processor is configured to determine that the income calculations determined from the plurality of models deviate from each other by a predetermined threshold; and set an alert for further analysis of the income calculations on the analyst workstation.

12. The system of claim 9, wherein the plurality of models include a conservative model, a standard model, and an optimistic model, wherein the income calculation determined by the conservative model is less than the income calculation determined by the standard model, and wherein the income calculation determined by the standard model is less than the income calculation determined by the optimistic model.

13. The system of claim 9, wherein the income related data is one element of a set of income related data determined from the separated documents, and wherein the set of income related data is incorporated by the plurality of models.

14. The system of claim 9, wherein the configuration of the models is based on income source type, calculation entity type, and assessment policies.

15. The system of claim 9, wherein the processor is configured to:

determine the completeness of the separated documents from the document package of income related documents in relation to expected income related documents; and generate a prompt to identify a missing document based on the separated documents being incomplete on the analyst workstation.

16. The system of claim 9, further comprising a document scanner coupled to the document server, the document scanner configured to produce an image of a physical package of income related documents.

* * * * *